(12) United States Patent
Zeng et al.

(10) Patent No.: US 12,341,800 B1
(45) Date of Patent: Jun. 24, 2025

(54) REAL-TIME ANOMALY DETECTION AND MITIGATION FOR STREAMING FUNCTIONAL DATA

(71) Applicant: SAS Institute Inc., Cary, NC (US)

(72) Inventors: Chengpeng Zeng, Ames, IA (US); Kai Shen, Apex, NC (US); Zohreh Asgharzadeh Talebi, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/982,812

(22) Filed: Dec. 16, 2024

Related U.S. Application Data

(60) Provisional application No. 63/682,159, filed on Aug. 12, 2024.

(51) Int. Cl.
| | | |
|---|---|---|
| *H04L 9/40* | (2022.01) | |
| *G16Y 30/10* | (2020.01) | |
| *H04L 41/16* | (2022.01) | |

(52) U.S. Cl.
CPC .......... *H04L 63/1425* (2013.01); *G16Y 30/10* (2020.01); *H04L 41/16* (2013.01)

(58) Field of Classification Search
CPC ... H04L 63/1425; H04L 41/16; H04L 41/147; H04L 63/1416; H04L 63/1433; G16Y 30/10; G06F 21/56
See application file for complete search history.

(56) References Cited

U.S. PATENT DOCUMENTS

| | | | |
|---|---|---|---|
| 10,303,954 B2 | 5/2019 | Xiao et al. | |
| 10,645,109 B1 * | 5/2020 | Lin | G06N 5/047 |
| 10,963,788 B1 | 3/2021 | Parker et al. | |
| 10,970,651 B1 | 4/2021 | Barker et al. | |
| 11,100,395 B2 | 8/2021 | Parker et al. | |
| 11,120,072 B1 | 9/2021 | Shen et al. | |

(Continued)

OTHER PUBLICATIONS

Salahuddin et al., "Chronos: DDoS Attack Detection Using Time-Based Autoencoder," IEEE Transactions on Network and Service Management Year: 2022 | vol. 19, Issue: 1 | Journal Article | Publisher: IEEE.*

(Continued)

*Primary Examiner* — Roderick Tolentino
(74) *Attorney, Agent, or Firm* — Dority & Manning, P.A.

(57) ABSTRACT

Functions representing sequences of values of a time-series dataset measured within a particular time period are accessed. For a current time window of the time period, a first discretized covariance function is computed that represents a relationship between each value measured within the current time window. Eigenanalysis of the first covariance function is performed to estimate first eigenfunctions. The current time window is incremented to obtain a subsequent time window that overlaps a majority of the current time window at a shared window region. A second discretized covariance function is computed for the subsequent time window and eigenanalysis is performed to estimate second normalized eigenfunctions. An angle change is computed between a portion of the first normalized eigenfunctions and a corresponding portion of the second normalized eigenfunctions located within the shared window region. Based on the angle change, an anomaly detection output is generated.

29 Claims, 20 Drawing Sheets

(56) References Cited

U.S. PATENT DOCUMENTS

| | | | |
|---|---|---|---|
| 11,321,581 B2 | 5/2022 | Cha et al. | |
| 11,361,255 B2 | 6/2022 | Parker et al. | |
| 11,887,012 B1 | 1/2024 | Kolay et al. | |
| 2006/0069955 A1* | 3/2006 | Oka | G06F 21/316 |
| | | | 714/25 |
| 2014/0006330 A1* | 1/2014 | Biem | G06F 21/552 |
| | | | 706/46 |
| 2018/0077179 A1* | 3/2018 | Zhang | H04L 63/1425 |
| 2022/0303167 A1* | 9/2022 | Wang | H04W 72/21 |
| 2022/0377097 A1* | 11/2022 | Bertiger | H04L 41/147 |
| 2023/0038977 A1* | 2/2023 | Ditto | G06F 11/3447 |
| 2024/0081663 A1* | 3/2024 | Park | A61B 5/7239 |
| 2025/0005145 A1* | 1/2025 | Kulathumani | G06F 21/554 |
| 2025/0047697 A1* | 2/2025 | Caithness | H04L 63/1425 |

OTHER PUBLICATIONS

Dutt et al., "A Proposed Machine Learning based Scheme for Intrusion Detection," 2018 Second International Conference on Electronics, Communication and Aerospace Technology (ICECA) Year: 2018 | Conference Paper | Publisher: IEEE.*

* cited by examiner

REAL-TIME ANOMALY DETECTION AND MITIGATION FOR STREAMING FUNCTIONAL DATA

PRIORITY CLAIM

This application claims the benefit of, and priority based on, 35 U.S.C. § 119 to U.S. Provisional Application No. 63/682,159, filed Aug. 12, 2024, the disclosure of which is incorporated herein by reference in its entirety.

BACKGROUND

Anomaly detection, also referred to as outlier detection, is the process of identifying data points, events, or observations that deviate substantially from other data within a particular dataset. Anomaly detection is important for both ensuring proper data collection and for verifying that collected data is accurate. For example, in the context of Internet-of-Things (IoT) devices or sensors, it is not uncommon for IoT sensors to experience errors or performance degradation in the field. Anomaly detection can be used to detect errors or performance degradation in real-time so that the errors can be mitigated or so that the device can be repaired. Such techniques can also be applied to detect and mitigate security vulnerabilities, fraud, etc. For example, anomaly detection techniques can be used to frustrate malicious actors by detecting outlier behavior patterns associated with malicious behavior. Effective anomaly detection is particularly important when analyzing real-time streaming functional data, such as time-series data. However, many existing anomaly detection techniques are designed primarily for application to non-functional data, and are not equally effective when applied to functional data (e.g., time-series data, etc.).

SUMMARY

One example implementation of the present disclosure is directed to a computer-program product tangibly embodied in a non-transitory machine-readable storage medium, the computer-program product including instructions operable to cause one or more processor devices to access a plurality of functions, each of the plurality of functions representing a corresponding sequence of values of a plurality of sequences of values of a time-series dataset, wherein the time-series dataset comprises values measured within a particular time period. The one or more processor devices are further to for a current time window of the particular time period, compute a first discretized covariance function that represents a relationship between each of a plurality of current time window values from the plurality of sequences of values, wherein each of the plurality of current time window values comprises a value measured at a time within the current time window. The one or more processor devices are further to perform eigenanalysis of the first discretized covariance function to estimate one or more first normalized eigenfunctions for the plurality of current time window values. The one or more processor devices are further to increment the current time window to obtain a subsequent time window of the particular time period, wherein a majority of the current time window overlaps a majority of the subsequent time window at a shared window region. The one or more processor devices are further to, for the subsequent time window of the particular time period, compute a second discretized covariance function that represents a relationship between each of a plurality of subsequent time window values from the plurality of sequences of values, wherein each value of the plurality of subsequent time window values comprises a value measured at a time within the subsequent time window. The one or more processor devices are further to perform eigenanalysis of the second discretized covariance function to estimate one or more second normalized eigenfunctions for the plurality of subsequent time window values. The one or more processor devices are further to compute an angle change between a portion of the one or more first normalized eigenfunctions located within the shared window region and a corresponding portion of the one or more second normalized eigenfunctions located within the shared window region. The one or more processor devices are further to, based on the angle change, generate an anomaly detection output indicative of whether at least one of the current time window or the subsequent time window comprises an anomalous window.

Another example implementation of the present disclosure is directed to a system including one or more data processors and a non-transitory computer-readable storage medium containing instructions which, when executed on the one or more data processors, cause the one or more data processors to access a plurality of functions, each of the plurality of functions representing a corresponding sequence of values of a plurality of sequences of values of a time-series dataset, wherein the time-series dataset comprises values measured within a particular time period. The one or more data processors are further to for a current time window of the particular time period, compute a first discretized covariance function that represents a relationship between each of a plurality of current time window values from the plurality of sequences of values, wherein each of the plurality of current time window values comprises a value measured at a time within the current time window. The one or more data processors are further to perform eigenanalysis of the first discretized covariance function to estimate one or more first normalized eigenfunctions for the plurality of current time window values. The one or more data processors are further to increment the current time window to obtain a subsequent time window of the particular time period, wherein a majority of the current time window overlaps a majority of the subsequent time window at a shared window region. The one or more data processors are further to for the subsequent time window of the particular time period, compute a second discretized covariance function that represents a relationship between each of a plurality of subsequent time window values from the plurality of sequences of values, wherein each value of the plurality of subsequent time window values comprises a value measured at a time within the subsequent time window. The one or more data processors are further to perform eigenanalysis of the second discretized covariance function to estimate one or more second normalized eigenfunctions for the plurality of subsequent time window values. The one or more data processors are further to compute an angle change between a portion of the one or more first normalized eigenfunctions located within the shared window region and a corresponding portion of the one or more second normalized eigenfunctions located within the shared window region. The one or more data processors are further to, based on the angle change, generate an anomaly detection output indicative of whether at least one of the current time window or the subsequent time window comprises an anomalous window.

Another example implementation of the present disclosure is directed to a computer-implemented method. The method includes accessing, by a computing system comprising one or more processor devices, a plurality of functions, each of the plurality of functions representing a corresponding sequence of values of a plurality of sequences of values of a time-series dataset, wherein the time-series dataset comprises values measured within a particular time period. The method further includes, for a current time window of the particular time period, computing a first discretized covariance function that represents a relationship between each of a plurality of current time window values from the plurality of sequences of values, wherein each of the plurality of current time window values comprises a value measured at a time within the current time window. The method further includes performing eigenanalysis of the first discretized covariance function to estimate one or more first normalized eigenfunctions for the plurality of current time window values. The method further includes incrementing the current time window to obtain a subsequent time window of the particular time period, wherein a majority of the current time window overlaps a majority of the subsequent time window at a shared window region. The method further includes for the subsequent time window of the particular time period, computing a second discretized covariance function that represents a relationship between each of a plurality of subsequent time window values from the plurality of sequences of values, wherein each value of the plurality of subsequent time window values comprises a value measured at a time within the subsequent time window. The method further includes performing eigenanalysis of the second discretized covariance function to estimate one or more second normalized eigenfunctions for the plurality of subsequent time window values. The method further includes computing an angle change between a portion of the one or more first normalized eigenfunctions located within the shared window region and a corresponding portion of the one or more second normalized eigenfunctions located within the shared window region. The method further includes, based on the angle change, generating an anomaly detection output indicative of whether at least one of the current time window or the subsequent time window comprises an anomalous window.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
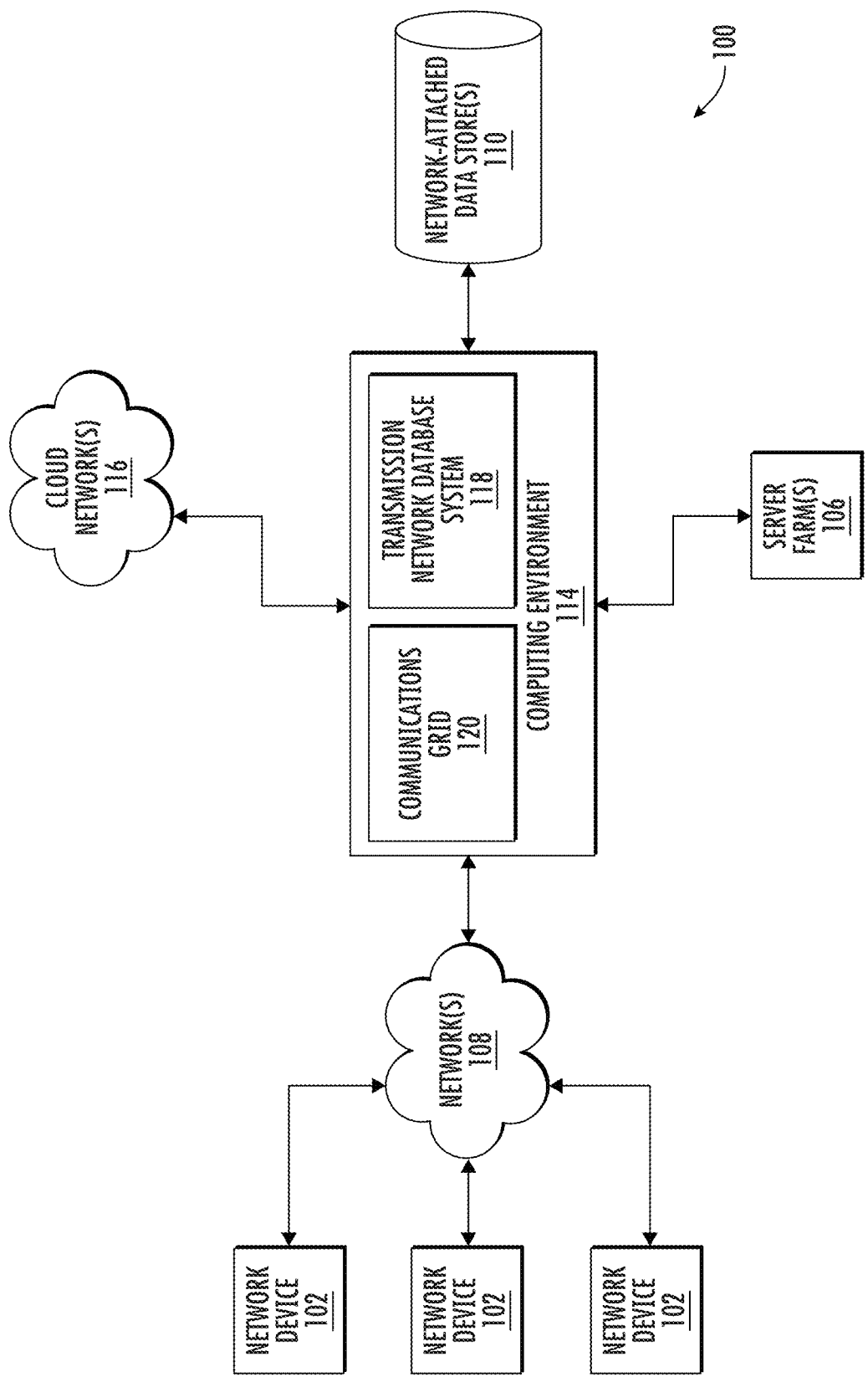
FIG. 1 illustrates a block diagram that provides an illustration of the hardware components of a computing system, according to some embodiments of the present technology.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Principal Component Analysis (PCA) is a widely utilized statistical technique designed for dimensionality reduction and data analysis. Typically, PCA is employed for datasets in which data elements are correlated. PCA works by transforming the original data into a smaller (i.e., dimensionally reduced) set of uncorrelated variables, known as principal components. These "principal components" capture the most significant patterns in the data while having fewer dimensions. PCA is commonly employed to reduce the dimensionality of high-dimensional datasets, enhance data visualization, identify meaningful features (e.g., for predictive modeling), etc. PCA is applied across a wide range of fields, including signal processing, machine learning, and bioinformatics.

Although PCA has been transformative in certain industries, PCA also comes with many limitations. Over time, improvements and modifications have been made to the original PCA technique to overcome these limitations. One such example is Moving Window PCA (MWCPA). A limitation to the conventional PCA technique is that PCA cannot be effectively applied to dynamic and non-stationary data (e.g., data that trends a certain direction over time, etc.). MWPCA overcomes this limitation by applying PCA within a sliding time window, allowing the analysis to focus on the most recent data while continuously updating the model as new information becomes available. This approach enables MWPCA to adapt to evolving patterns and relationships in data. Due to this adaptability, MWPCA is popular in fields where underlying processes are subject to change over time (e.g., industrial process monitoring, real-time environment monitoring, etc.).

However, MWPCA has its own limitations. Although MWPCA serves as a more effective application of PCA in the realm of streaming data (i.e., information received in real-time) and dynamic data, both MWPCA and the original PCA technique operate on discrete space. As such, MWPCA (and PCA) are ineffective when applied to datasets in functional space (i.e., the time domain). For example, assume that a dataset includes measurements obtained from a group of light intensity sensors located on a farm. As time passes, the measure of light intensity can change substantially when day transitions to night and vice versa. Further assume that a particular light intensity sensor experiences a bug that causes the sensor to report an anomalous light intensity lower than the other sensors while the sun is setting. Although each sensor will report a decrease in light intensity as the sun sets, the erroneous light sensor can report a substantially greater decrease. However, MWPCA operates in discrete space, and as such, is not sensitive to anomalies that occur during regular temporally-driven variations in data. More specifically, because conventional MWPCA approaches operate in discrete space, anomaly detection performance for MWPCA can be relatively poor when an anomaly is "masked" or occluded by temporally driven variations in data, such as the temporally driven variations for light intensity caused by the sun rising and setting.

This limitation substantially restricts the applicability of MWPCA to datasets that include discrete (i.e., non-functional) data. However, functional data has become increasingly relevant in many industries, such as healthcare (e.g., biosignal analysis, organ growth curves, functional Magnetic Resonance Imaging (MRI) data, etc.), energy (e.g., modeling electricity usage, wind speed, etc.), environment analysis (e.g., oxygen levels, temperature, precipitation, etc.), industrial processes (e.g., process monitoring, sensor monitoring, etc.), and others. Furthermore, although MWPCA extends the applicability of PCA, MWPCA also demands a relatively high computational resource cost. As such, an approach that extends the applicability of MWPCA while reducing the associated computational complexity is greatly desired.

Accordingly, implementations described herein propose Moving Window Functional Component Analysis (MWFPCA) for anomaly detection. More specifically, assume that a dataset accessible to a computing system stores functional data, such as a time-series dataset. The computing system can access a plurality of functions (e.g., time-series functions) that represent corresponding sequences of values from the time-series dataset. The values represented by the functions can be values obtained during a particular time period. For example, if each of the functions represents temperature measurements from temperature sensors that are configured to regularly collect temperature measurements, the values stored to the time-series database may include measurements from the past two weeks.

The computing system can compute a first discretized covariance function for a first, or "current" time window. A discretized covariance function is a function that represents the relationship between points in a dataset after the dataset has been separated into discrete portions. A "time window" refers to a discrete portion or segment of a time period over which the values stored to the time-series database were collected. As such, the time period over which the values were collected can be segmented into discrete time windows (i.e., time periods, time segments, etc.), and a discretized covariance function can be computed for a "first" or current time window within the time period. For example, if the time-series database includes values collected over a time period of 12 hours, the "current" or first time window can represent an initial portion of the time period between hours 0-2. The values stored to the time-series database that were captured during the current time window can be referred to as "current" time window values.

As such, the discretized covariance function calculated for the current time window can represent a relationship between each current time window value measured at a time within the current time window. It should be noted that the phrases "current" and "subsequent" are primarily used herein to more clearly differentiate between windows when discussing multiple time windows, and can refer to any pair of adjacent time windows within a time period. For example, if a time period included ten time windows, the current and subsequent time windows may refer to time windows 1 and 2, 4 and 5, 9 and 10, etc.

The computing system can perform eigenanalysis of the first discretized covariance function to estimate one or more normalized eigenfunctions for the plurality of current time window values. Eigenanalysis is a technique that derives eigenvectors and corresponding eigenvalues from data. An eigenfunction can represent a "direction" of data along which a transformation occurs, while the eigenvalue corresponding to the eigenvector can represent a degree of transformation. In some implementations, if the computing system generates a plurality of eigenfunctions, the computing system can select a "primary" or representative first eigenfunction by identifying the first eigenfunction with the highest corresponding eigenvalue.

The computing system can increment the current time window to obtain a subsequent time window of the particular time period. A majority of the current time window can overlap a majority of the subsequent time window at a shared window region. For example, if the time period is 10 hours, the current time window can be hours 1-3 and the second time window can be 2-4, and a majority of the current time window can overlap a majority of the subsequent time window at the shared window region of hours 2-3. As such, the "time window" described herein can also be referred to as a "moving" or "sliding" window that is incremented over time to "slide" or "move" the time window across the time period and analyze the dataset in its entirety. For example, the computing system may initiate two moving window data structures (e.g., a vector, etc.) that iteratively "moves" or "slides" over the values of the dataset, and when the window moves at each iteration, "old" values are removed from the window and "new" values are added to the window.

For the subsequent time window, the computing system can compute a second discretized covariance function that represents a relationship between subsequent time window values measured at a time within the subsequent time window. To follow the previous example, if the subsequent time window includes hours 2-4 of the 10 hour time period, the second covariance function can represent the subsequent time window values measured at a time between hours 2-4 (and the first covariance function can represent the current time window values measured at a time between hours 1-3).

The computing system can perform eigenanalysis of the second discretized covariance function to estimate one or more second normalized eigenfunctions for the plurality of subsequent time window values. The computing system can then compute an angle change between the one or more first normalized eigenfunctions and the one or more second normalized eigenfunctions. More specifically, in some implementations, the computing system can identify a "primary" first eigenfunction as a principal component to represent the current time window based on the primary first eigenfunction being associated with the highest eigenvalue of the first eigenvalues. The computing system can also identify a "primary" second eigenfunction to represent the subsequent time window based on the primary second eigenfunction being associated with the highest eigenvalue of the second eigenvalues.

The computing system can compute the angle change between a portion of the primary first eigenfunction and a corresponding portion of the primary second eigenfunction. The portions of the primary first eigenfunction and the primary second eigenfunction can be located within the shared window region that is occupied by both the current time window and the subsequent time window (e.g., the region at which the majorities of the time windows overlap). For example, if the primary first eigenfunction is a function that represents the current time window between hours 1-3, and the primary second eigenfunction is a function that represents the subsequent time window between hours 2-4, the portion of the primary first eigenfunction and the portion of the primary second eigenfunction can both correspond to the shared window region between hours 2-3.

The angle change can represent a degree of similarity between the values measured within the current time window and the values measured within the subsequent time window. A low degree of angle change can indicate a low likelihood of an anomalous window (i.e., a window that includes anomalous values), and vice versa. As such, based on the angle change, the computing system can generate an anomaly detection output indicative of whether the current time window and/or the subsequent time window is an anomalous window. In such fashion, implementations described herein effectively extend PCA to sparse functional data, therefore enabling increases in computational efficiency provided by the PCA technique when processing functional datasets.

Aspects of the present disclosure provide a number of technical effects and benefits. As one example technical effect and benefit, the MWFPCA approach described herein can be applied in substantially less time than existing approaches, such as MWPCA. For example, the majority of the time complexity of both MWPCA and MWFPCA implementations described herein is driven by computing covariance functions and performing eigenanalysis. Given a data matrix of n functions and p timepoints, these operations incur a time complexity of $O(np^2)+O(p^3)$. Because MWPCA operates on discrete space, rather than functional space, the time complexity of MWPCA cannot be easily reduced. However, because MWFPCA operates on functional space (i.e., time), the number of timepoints p (e.g., times at which values are sampled from functions) within each time window can be reduced to correspondingly reduce the time complexity of MWFPCA. As the number of sampled timepoints within a time window is reduced to be less than the number of functions, the MWFPCA implementations described herein can exhibit substantially superior performance to existing PCA techniques such as MWPCA. For example, if the number of p timepoints is reduced so that the number of n functions is twice the number of p timepoints, the time complexity of MWFPCA can be up to eight times faster than MWPCA when applied to the same dataset. Furthermore, the space complexity (e.g., a quantity of memory utilized, etc.) can be reduced equivalently, therefore reducing the computational memory cost by a factor of eight.

As another example, the improvements in time and computational complexity described above enable the application of MWFPCA to real-time streaming functional data for anomaly detection. In turn, anomaly detection for streaming functional data can serve to reduce computational resource costs (e.g., making resource allocation decisions based on anomalies detected in streaming functional performance data), improve functionality of autonomous systems (e.g., detecting anomalies in streaming functional data from autonomous vehicle sensors, industrial process sensors, etc.), and secure virtual environments (e.g., detecting anomalies in streaming functional data to identify malicious actions or actors, etc.).

MWFPCA implementations described herein can be implemented as hardware, software, or a combination thereof. For example, the MWFPCA anomaly detection implementations described herein may be implemented as a circuit in a computing or processor device (e.g., a Field-Programmable Gate Array (FPGA), Application-specific Integrated Circuit (ASIC), microcontroller, a digital signal processor, etc.). For another example, the MWFPCA anomaly detection implementations can be implemented as software or software instructions (e.g., a program, module, function, process, procedure, application, etc.).

EXAMPLE SYSTEMS

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
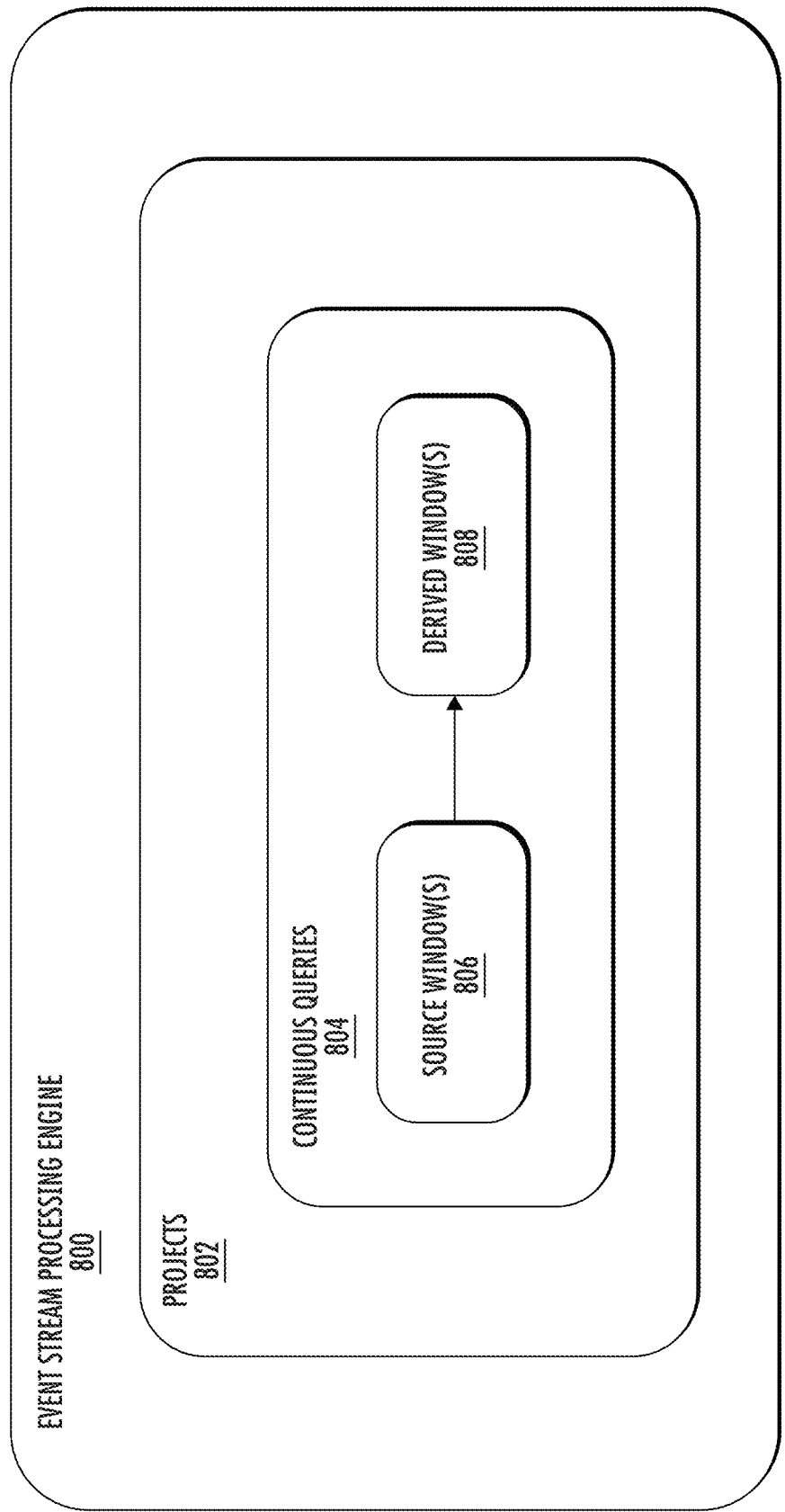
FIG. 8 illustrates a block diagram including components of an Event Stream Processing Engine (ESPE), according to embodiments of the present technology.
Figure 9:
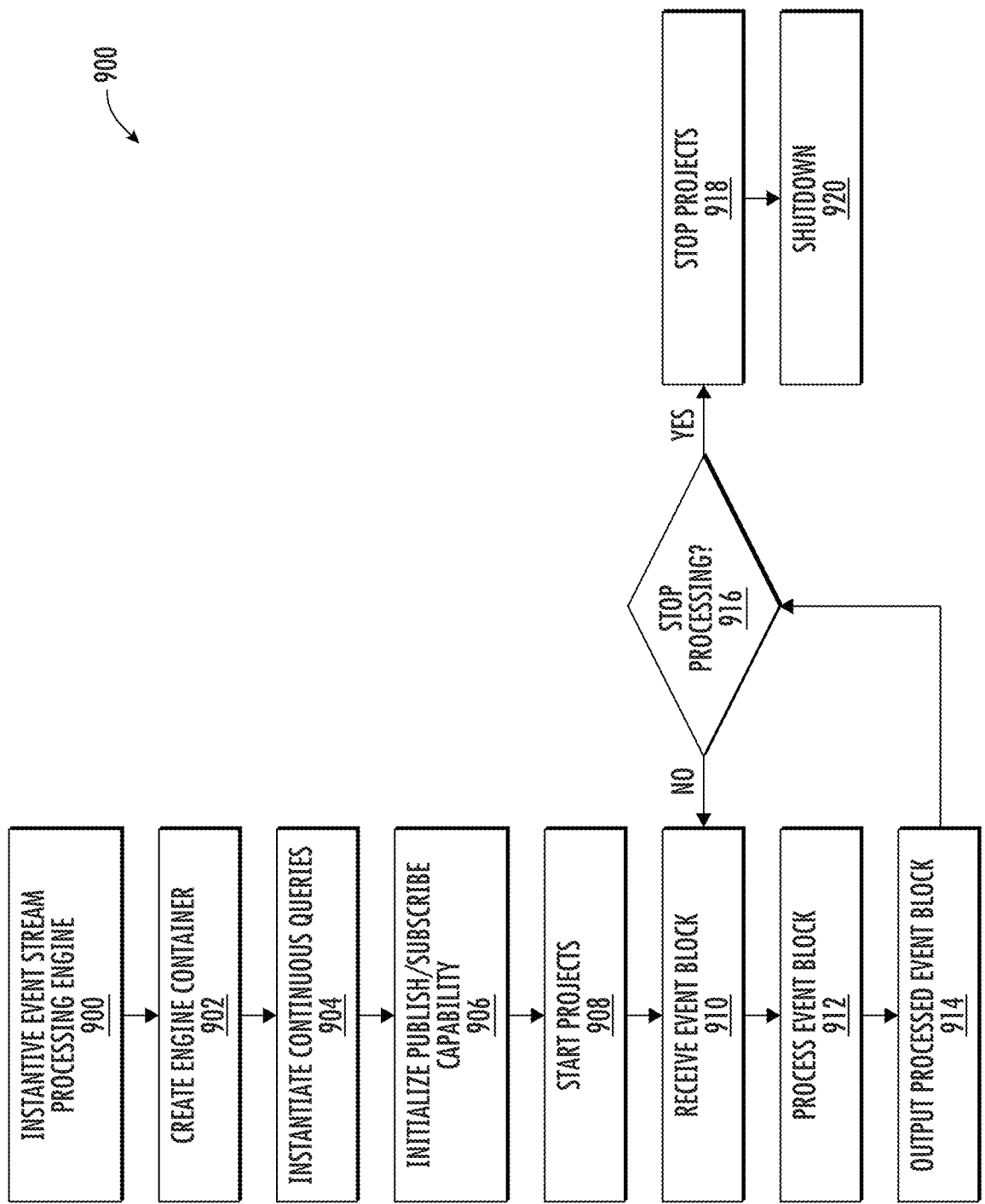
FIG. 9 illustrates a flow chart showing an example process including operations performed by an event stream processing engine, according to some embodiments of the present technology.
Figure 10:
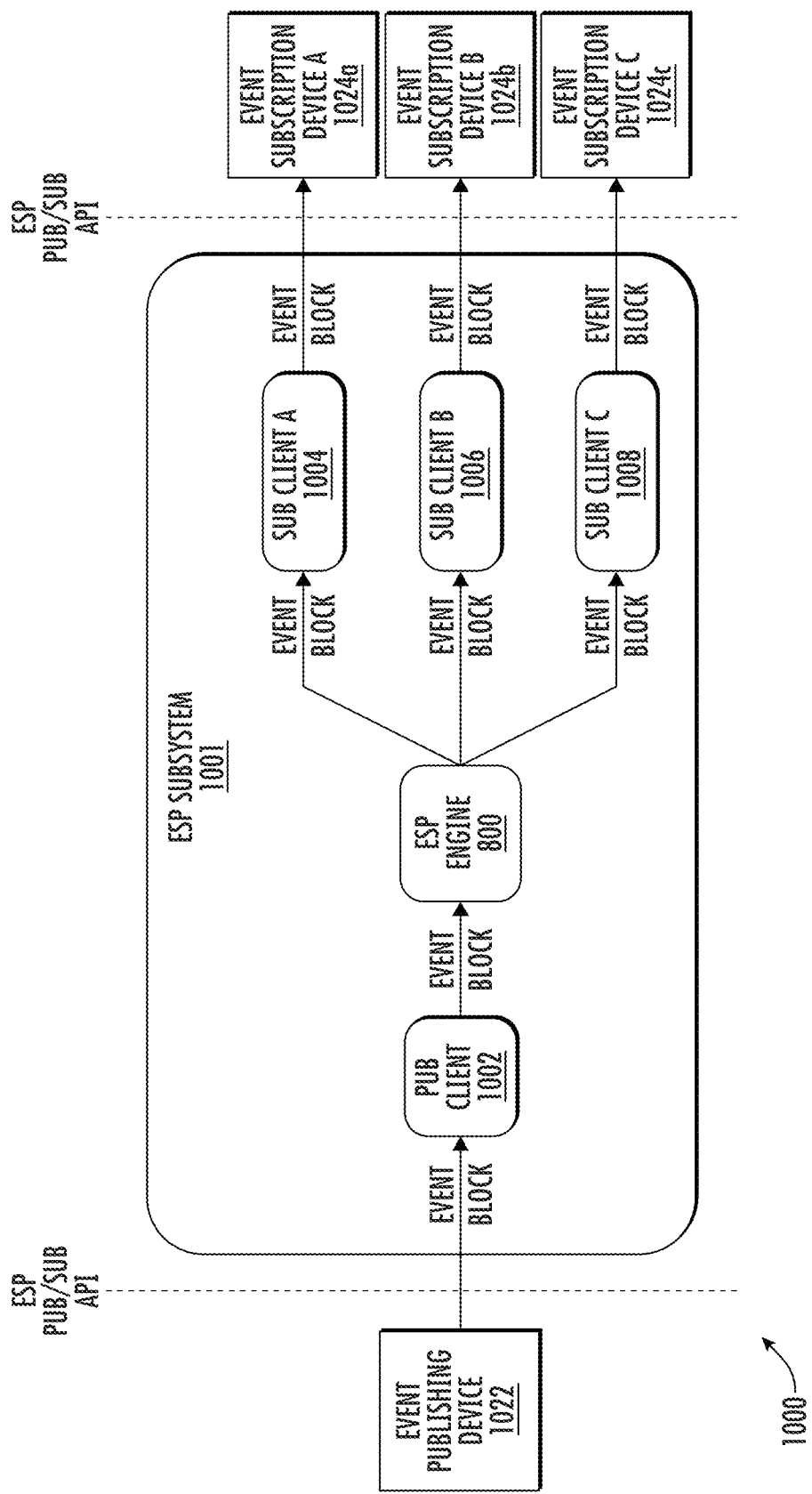
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time. For another example, the server farms may process sensor data using one of the various MWFPCA implementations described herein.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the computing environment 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet-of-Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system and the transmission network database system 118 may share the same processor hardware, such as processors that are located within computing environment 114.

Figure 2:
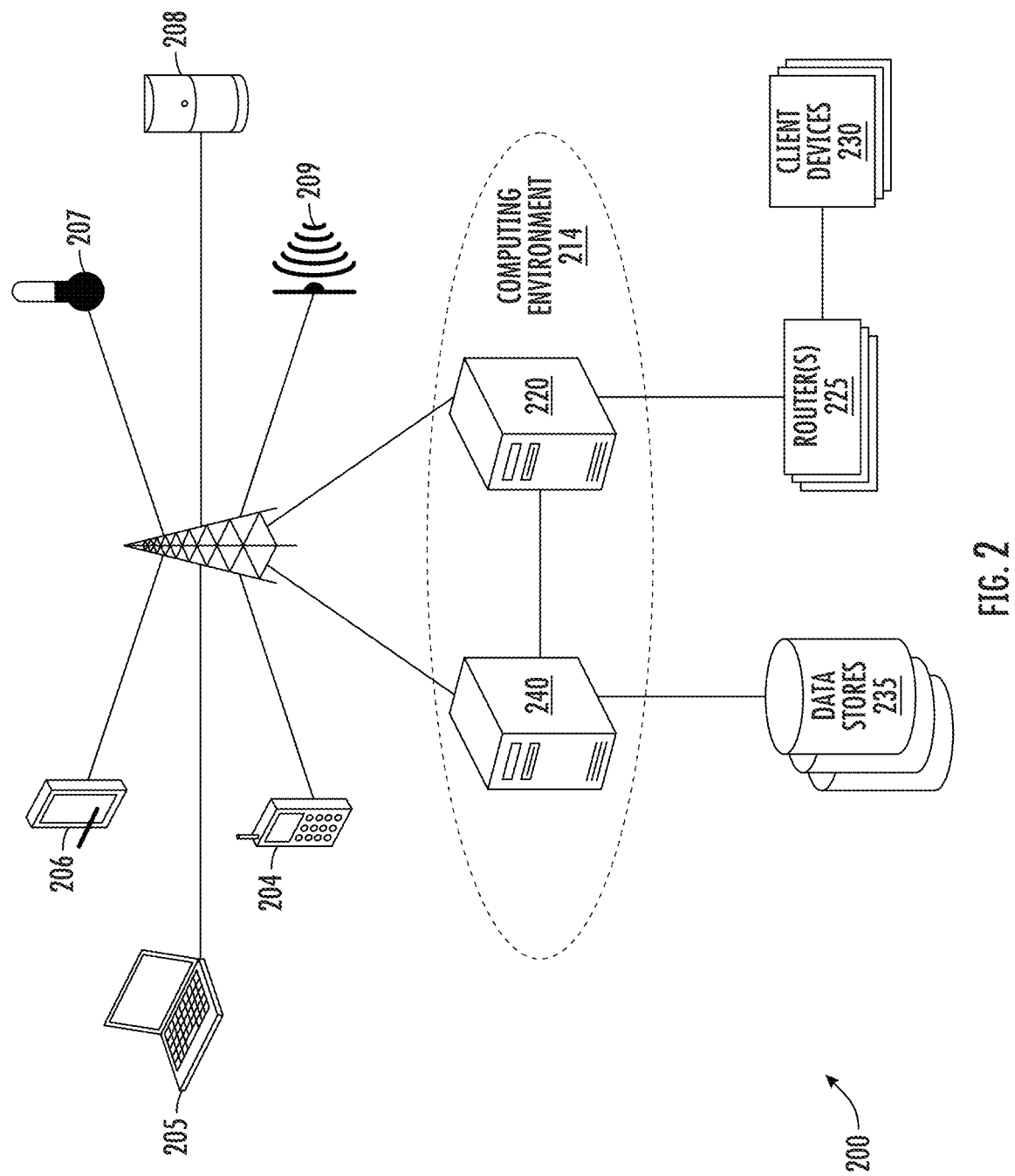
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

In some implementations, device(s) described with regards to FIG. 2 (e.g., sensors, devices that include sensors, devices that receive sensor data, etc.) can locally process or pre-process data prior to transmission. For example, the device(s) may process data using one of the various MWFPCA implementations described herein.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
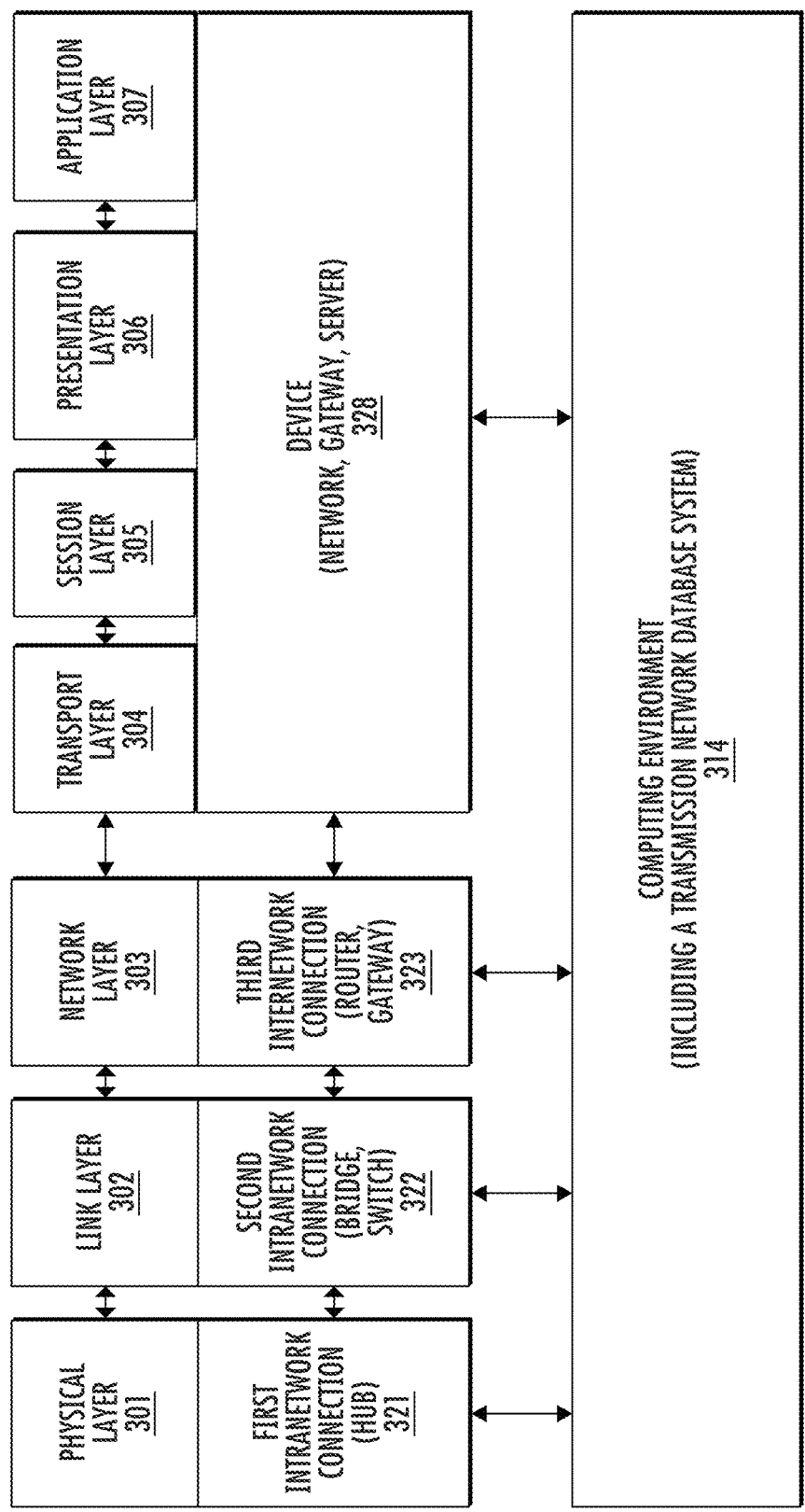
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bytes of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid. In some implementations, a node can locally process or pre-process a portion of data distributed to the node. For example, the node can perform one of the various MWFPCA implementations described herein.

Figure 4:
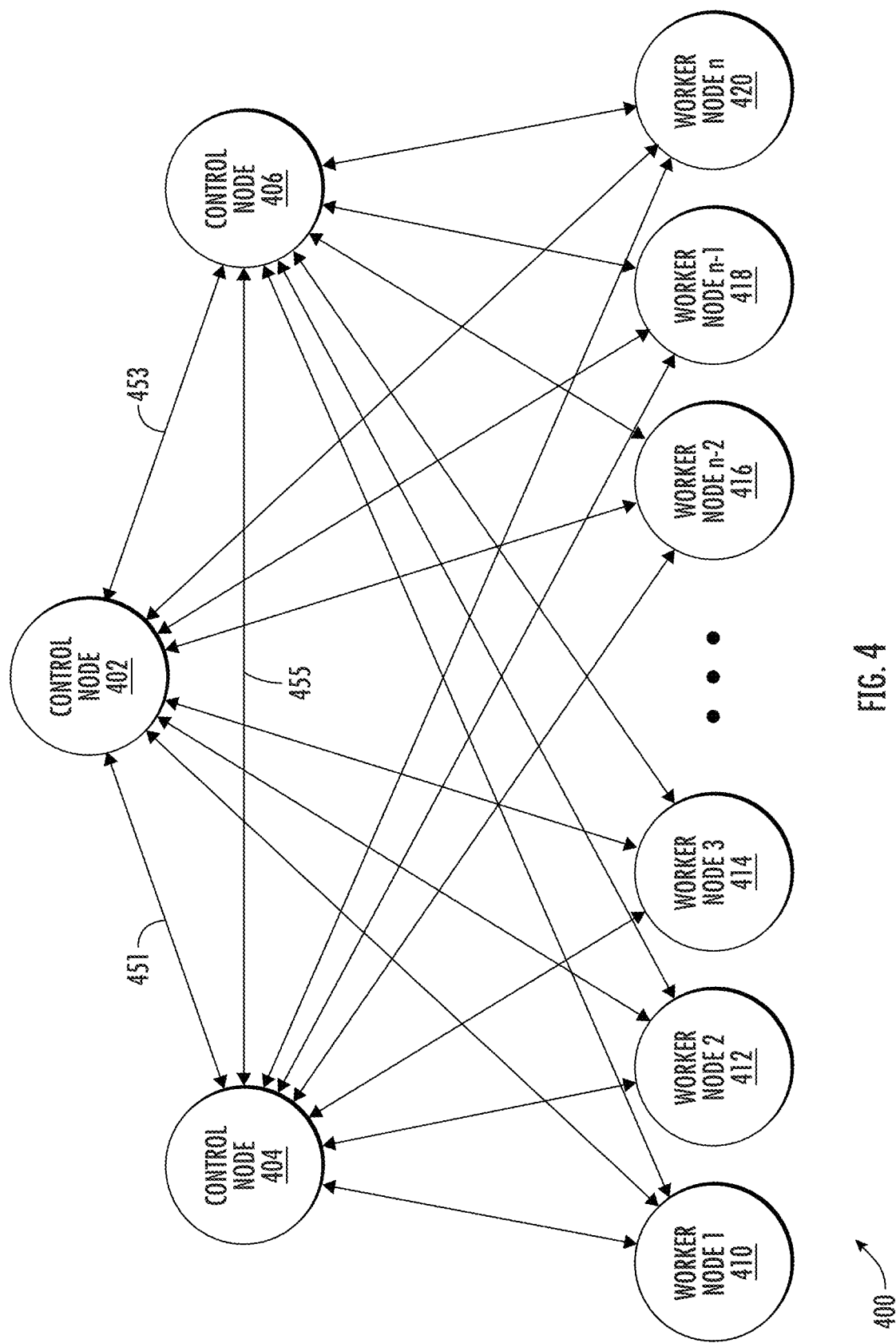
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
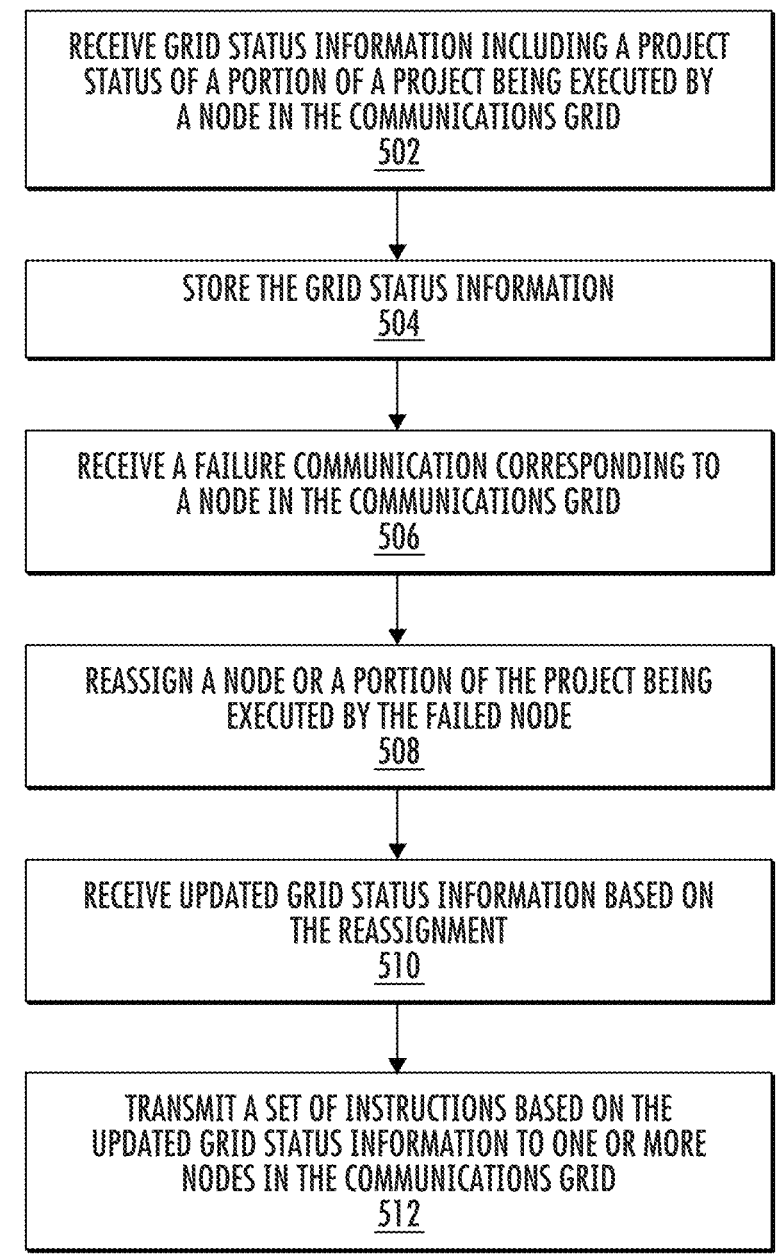
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
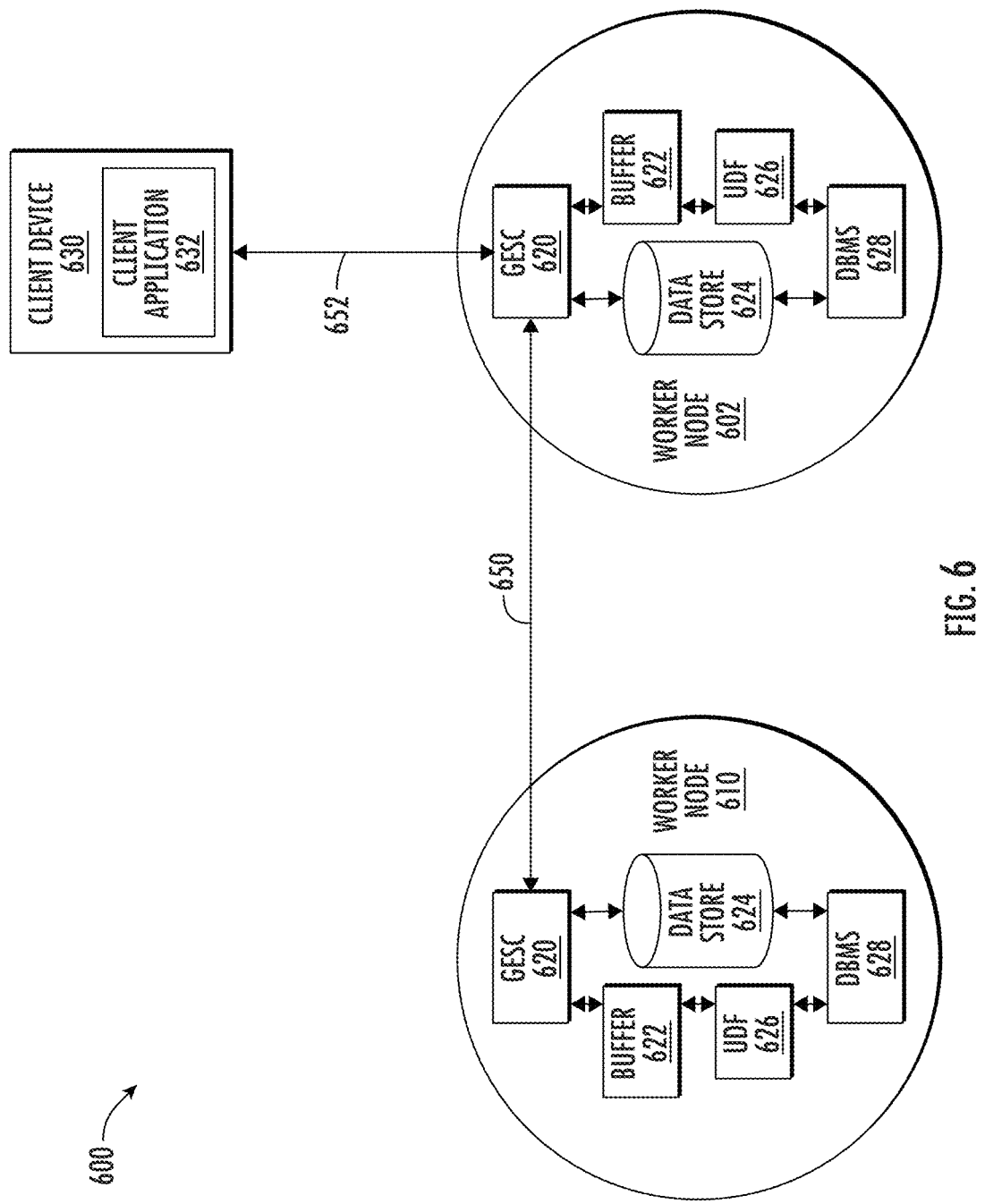
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
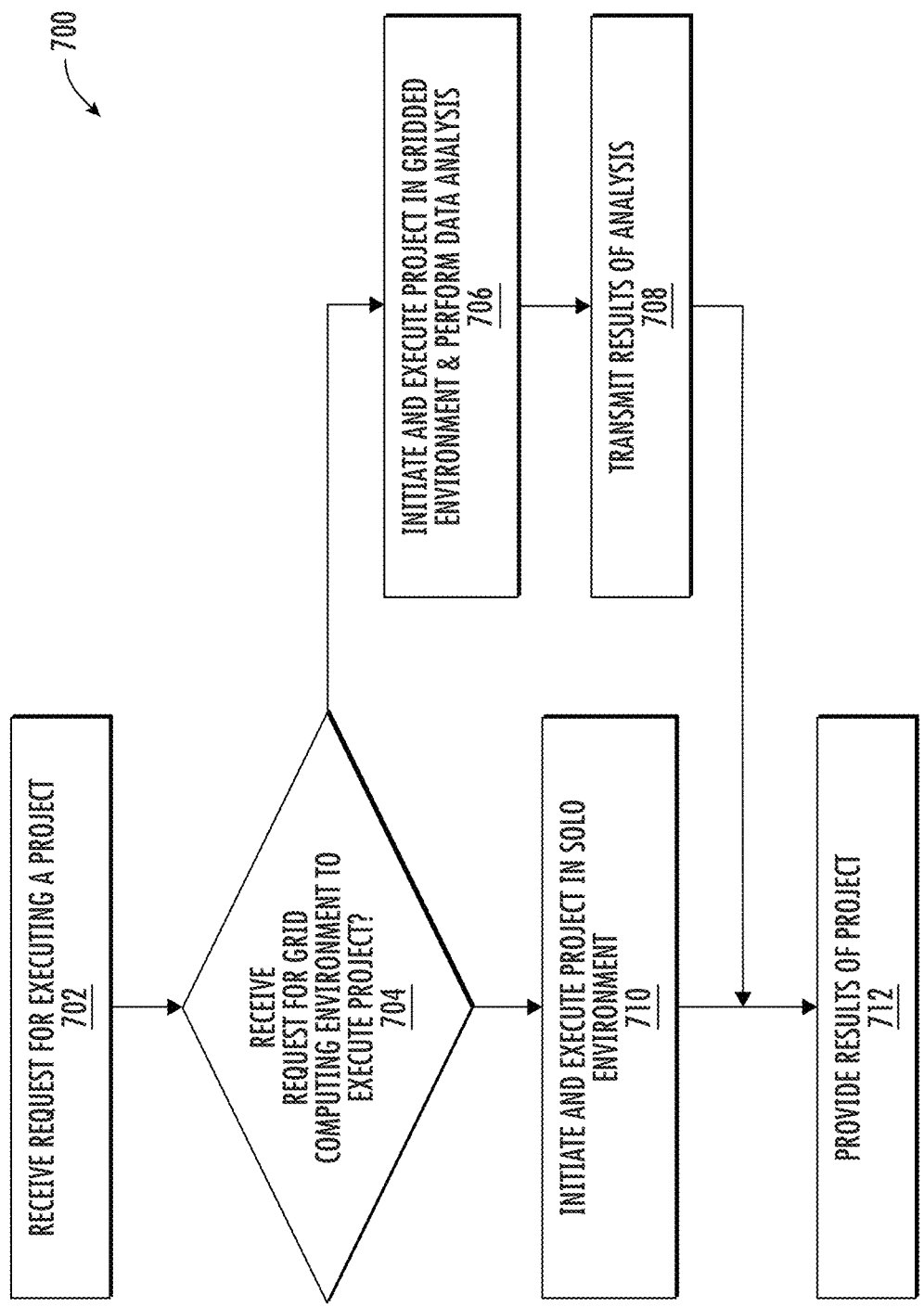
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704. For example, the instructions may instruct the grid-based computing environment to perform one of the various MWFPCA implementations described herein.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

In some implementations, the ESPE can apply a data filtering technique to event streams. In instances where real-time processing for event streams is required, the ESPE can use one of the various MWFPCA implementations described herein.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing devices of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or affected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
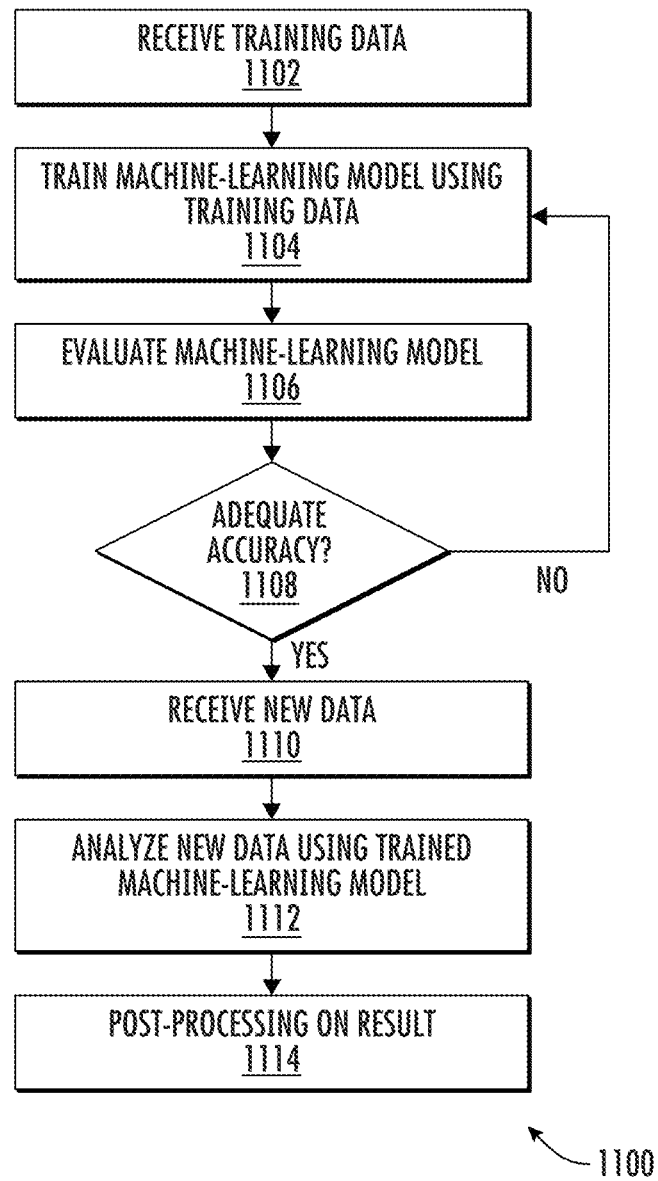
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In some implementations, prior to or subsequent to receipt of the training data, the training data can be processed to remove outlier training data elements. For example, the training data can be processed using one of the various MWFPCA implementations described herein.

In block 1104, a machine-learning model is trained using the training data. The machine-learning model can be trained in a supervised, unsupervised, or semi-supervised manner.

In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
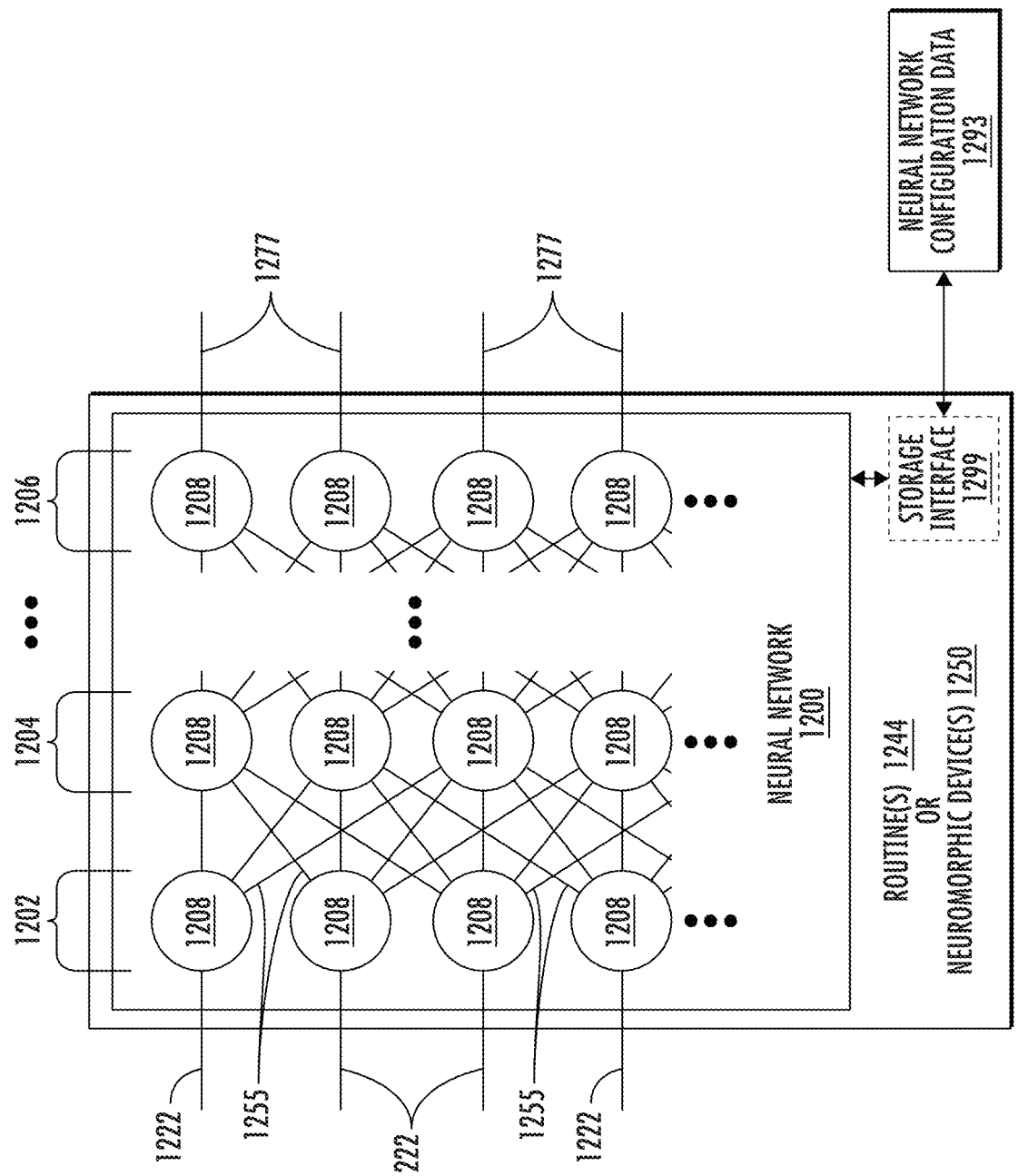
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
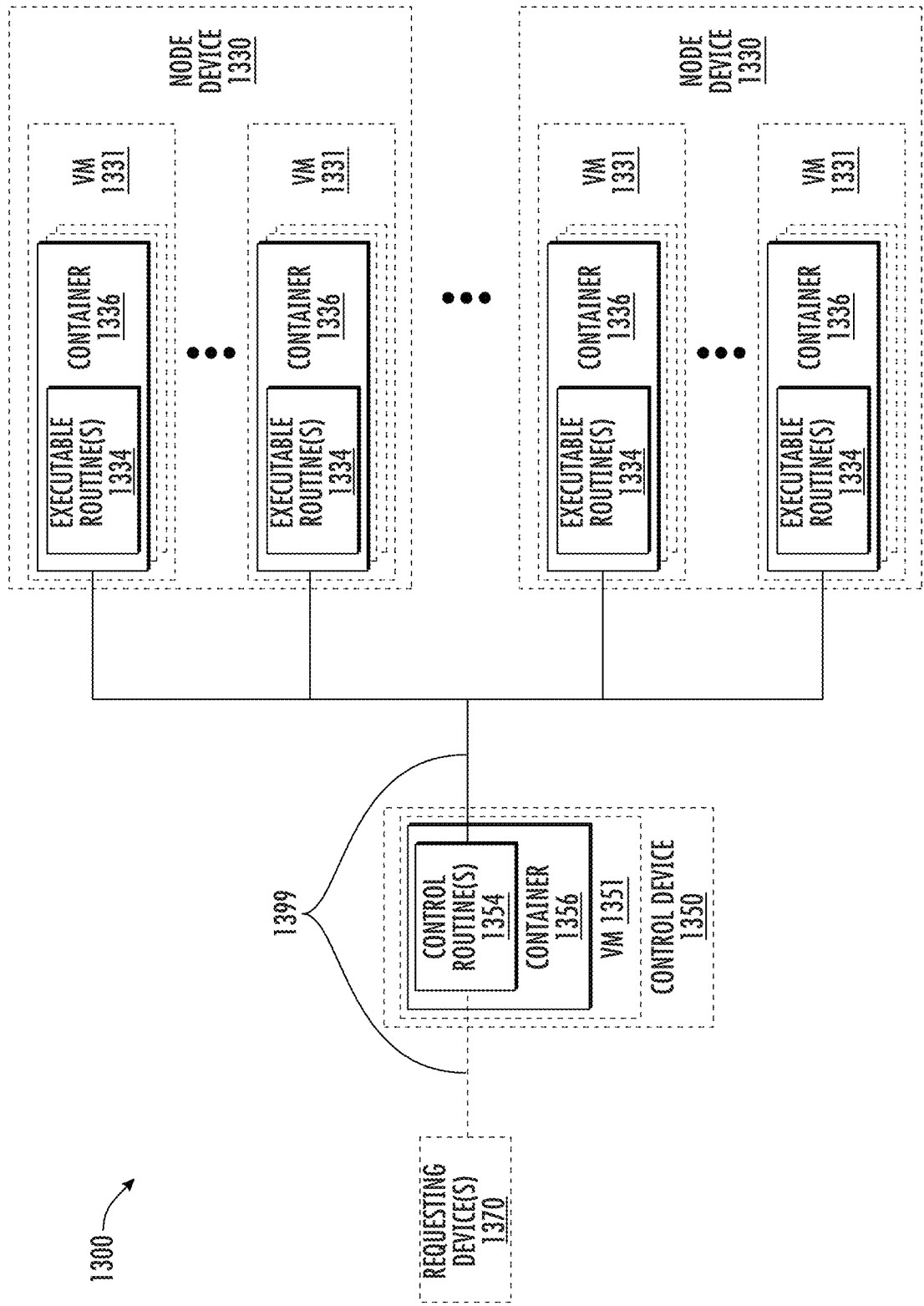
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336. For example, the operations or routines described with regards to the various MWFPCA implementations described herein (e.g., with regards to FIGS. 14-20) can be executed within a single container or distributed for execution across a plurality of containers.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that affects a nested allocation of resources, such as the afore-described example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Figure 14:
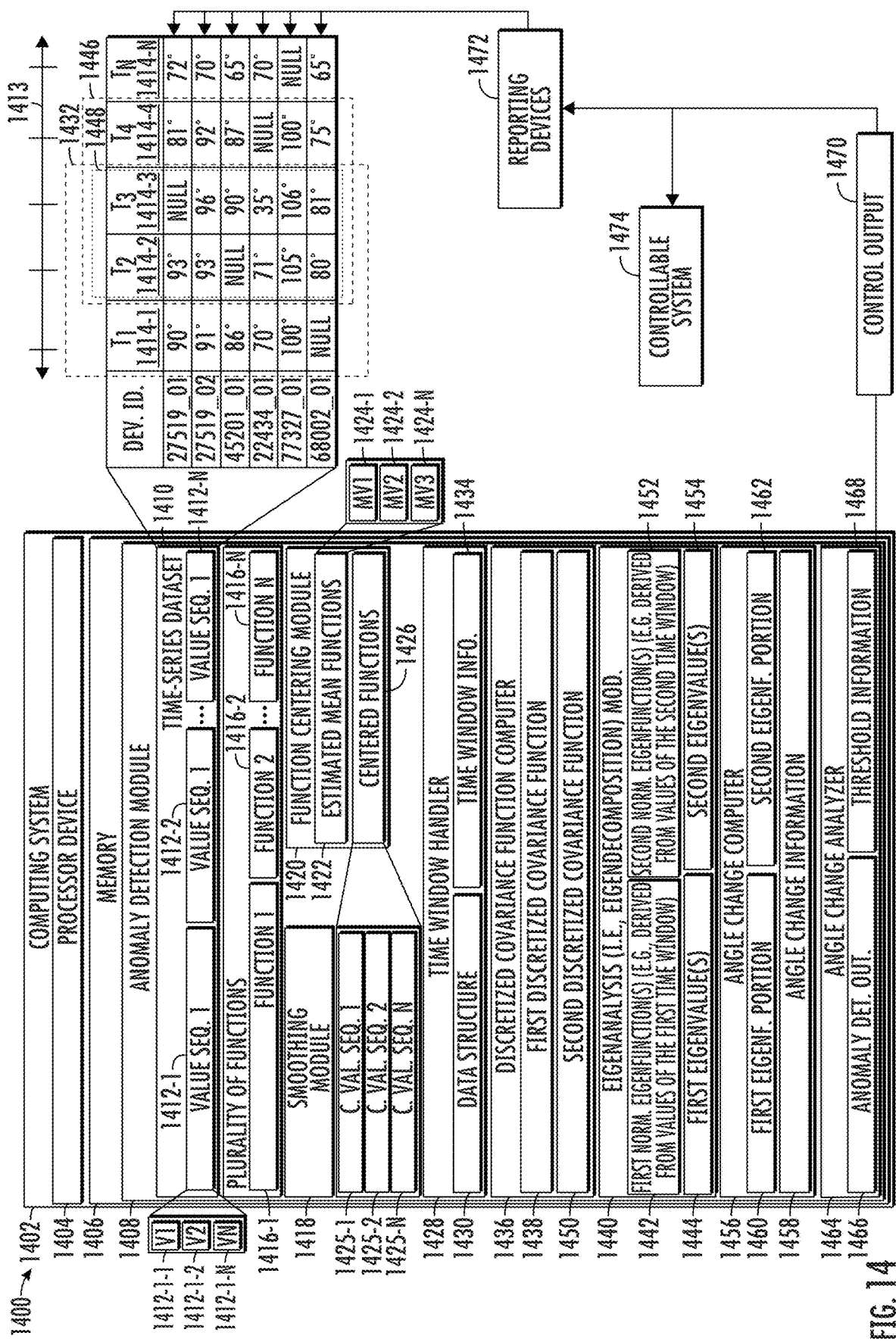
FIG. 14 is a block diagram of a computing environment suitable for Moving Window Functional Principal Component Analysis (MWFPCA) for anomaly detection according to some implementations of the present disclosure.

FIG. 14 is a block diagram of a computing environment 1400 suitable for Moving Window Functional Principal Component Analysis (MWFPCA) for anomaly detection according to some implementations of the present disclosure. A computing environment 1400 can include a computing system 1402 with one or more processor device(s) 1404 and a memory 1406. As described herein, the "computing environment" 1400 can be any type or manner of computing environment (e.g., a collection of computing devices, systems, and related infrastructure associated with a particular entity or organization) in which data is processed or filtered.

In some implementations, the computing system 1402 may be a computing system or computing apparatus that includes multiple computing devices. Alternatively, in some implementations, the computing system 1402 may be one or more computing devices within a computing system that includes multiple computing devices. Similarly, the processor device(s) 1404 may include any computing or electronic device capable of executing software instructions to implement the functionality described herein.

The memory 1406 can be or otherwise include any device(s) capable of storing data, including, but not limited to, volatile memory (random access memory, etc.), non-volatile memory, storage device(s) (e.g., hard drive(s), solid state drive(s), etc.). In some implementations, the memory 1406 can include a containerized unit of software instructions (i.e., a "packaged container"). The containerized unit of software instructions can collectively form a container that has been packaged using any type or manner of containerization technique.

A containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

In some implementations, the computing environment 1400 can include multiple types of nodes. As described herein, a "node" generally refers to a discrete unit of hardware and/or software resources. In some instances, nodes within the computing environment 1400 can be configured to perform specific tasks. For example, some nodes within the computing environment 1400 can be configured as "compute" or "processing" nodes that handle processing tasks or provide processing-heavy services. Compute nodes are generally allocated with hardware devices that can facilitate processing tasks, such as Graphics Processing Units (GPUs), Central Processing Units (CPUs), Application-specific Integrated Circuits (ASICs), Field-Programmable Gate Arrays (FPGAs), etc.

Conversely, storage nodes can be allocated with hardware devices to facilitate storage tasks, such as storage devices (e.g., hard drives, etc.), memory, high-bandwidth network devices, physical storage media, etc.). It should be noted that in some instances, storage nodes can include processing devices (e.g., CPUs, etc.) to facilitate storage operations (e.g., read/write operations) and processing nodes can include storage devices (e.g., random access memory) to facilitate processing operations.

The memory 1406 of the computing system 1402 can include an MWFPCA anomaly detection module 1408. The MWFPCA anomaly detection module 1408 can perform MWFPCA to detect modules in functional data. For example, the MWFPCA anomaly detection module 1408 can detect anomalies in real-time streaming functional data, stored functional datasets, etc. In particular, the MWFPCA anomaly detection module 1408 can include a time-series dataset 1410. The time-series dataset 1410 is a collection of data points recorded or measured over time at regular or irregular intervals. The time-series dataset 1410 can include a plurality of values sequences 1412-1-1412-N (generally, value sequences 1412). Each of the plurality of value sequences can include a plurality of sequential time-series values. For example, the value sequence 1412-1 can include values 1412-1-1-1412-1-N, the value sequence 1412-2 can include a plurality of values (not illustrated), etc.

The value sequences 1412 can include values that were measured or otherwise obtained within a particular time period 1413. The time period 1413 can be any duration of time (e.g., a second, hour, day, week, month, etc.). The time period 1413 can include a plurality of timepoints 1414-1-1414-N (generally, timepoints 1414). The timepoints 1414 can represent discrete points in time in which some (or all) of the values of the value sequences 1412 were measured. To follow the depicted example, values sequences 1412-1-1412-5 (represented in the illustrated example by device IDs 27159_01, 27519_02, 45201_01, 22434_01, and 77327_01, respectively) can each include a measured temperature value at the timepoint 1414-1, while the value sequence 1412-N (represented in the illustrated example by device ID 68002_01) includes a missing or NULL value at the timepoint 1414-1.

The MWFPCA anomaly detection module 1408 can access a plurality of functions 1416-1-1416-N (generally, functions 1416). The functions 1416 can respectively represent the value sequences 1412. For example, the function 1416-1 can be a continuous function that represents the values of the value sequence 1412-1. In some implementations, the functions 1416 can be derived from the value sequences 1412. Specifically, in some implementations, the MWFPCA anomaly detection module 1408 can access the functions 1416 by applying some manner of conventional function derivation technique to the functions 1416. For example, the MWFPCA anomaly detection module 1408 may derive the function 1416-1 based on the values 1412-1-1-1412-1-N of the value sequence 1412-1. Alternatively, in some implementations, the functions 1416 can be pre-derived and stored within the time-series dataset 1410. Alternatively, in some implementations, the functions 1416 can be obtained from another module, service, system, device, etc. (internal or external to the computing system 1402) that derives the functions 1416 from the value sequences 1412.

In some implementations, the MWFPCA anomaly detection module 1408 includes a smoothing module 1418. The smoothing module 1418 can be a module including one or more data smoothing schemas. As described herein, a "smoothing schema" refers to some process, algorithm, transformation, formula, etc. applied to data to reduce noise or random fluctuations within the data. Examples of smoothing schemas include exponential smoothing, Gaussian smoothing, median smoothing, spline smoothing, etc. Alternatively, in some implementations, the functions 1416 can be smoothed prior to being accessed by the MWFPCA anomaly detection module 1408 (i.e., "pre-smoothed" value sequences).

In some implementations, the MWFPCA anomaly detection module 1408 can include a function centering module 1420. The function centering module 1420 can be utilized to center the functions 1416 prior to analysis of the functions 1416. As described herein, a "centered" function refers to a function that has been adjusted so that the mean value of the function is zero. To center the functions 1416, the function centering module 1420 can compute an estimated mean function 1422. The estimated mean function can represent a sequence of mean values 1424-1-1424-N (generally, sequence of mean values 1424). For example, the function centering module 1420 can generate the sequence of mean values 1424 by computing a mean value at each of the timepoints 1414. For example, the mean value 1424-1 can be generated by finding the mean of the values captured at timepoint 1414-1. To follow the depicted example, the mean value 1424-1 can be calculated as the average of values 90°, 91°, 86°, 70°, and 100°.

The function centering module 1420 can compute a plurality of centered functions 1426. Each of the centered functions 1426 can represent a centered version of a corresponding function of the functions 1416. To do so, the function centering module 1420 can subtract each value of the sequence of mean values 1424 from a corresponding value of each value sequence of the value sequences 1412. More specifically, the function centering module 1420 can, for each of the value sequences 1412, subtract each value of the value sequence by a corresponding estimated mean value 1424 to obtain corresponding centered value sequences 1425-1-1425-N (generally, centered value sequences 1425). The function centering module 1420 can then derive the centered functions 1426 from the centered value sequences 1425.

For example, to obtain a centered function for the function 1416-1, the computing system can subtract mean value 1424-1 from the value 1412-1-1, subtract mean value 1424-2 from the value 1412-1-2, etc. to obtain a centered value sequence 1425-1, and then compute a centered function of the centered functions 1426 based on the centered value sequence 1425-1. If the function centering module 1420 is utilized to generate the centered functions 1426, the MWFPCA anomaly detection module 1408 can utilize the centered functions 1426 in lieu of the corresponding non-centered functions 1416.

The MWFPCA anomaly detection module 1408 can include a time window handler 1428. The time window handler 1428 can instantiate and/or manage time window(s) within the time period 1413 over which the value sequences 1412 were measured. As described previously, in some implementations, a "time window" may refer to a particular segment or portion of the time period 1413. For example, if the time period 1413 is 10 hours long, a time window may refer to hours 0-2 of the 10 hours. Additionally, or alternatively, in some implementations, the time window can refer to a data structure that stores values from the value sequences 1412 that were measured during a corresponding portion of the time period 1413. To follow the previous example, the time window may refer to hours 0-2 of the 10 hour time period and/or may refer to a data structure 1430 holding the values obtained during hours 0-2 of the 10 hour time period.

In particular, the time window handler 1428 can identify a first or "current" time window 1432 within the time period 1413. In FIG. 14, the current time window 1432 is illustrated as a dashed box that surrounds specific values from the time-series dataset 1410. Values are illustrated as being located within the dashed box that represents the current time window 1432 if those values are included in the current time window 1432. To follow the illustrated example, values measured at timepoints 1414-1, 1414-2, and 1414-3 are included in the current time window 1432. The time window handler 1428 can include time window information 1434. The time window information 1434 can track a current "location" of the time window within the dataset, maintain references to locations of values within memory, etc.

The MWFPCA anomaly detection module 1408 can include a discretized covariance function computer 1436 (i.e., a discretized covariance function computation module). The discretized covariance function computer 1436 can compute a first discretized covariance function 1438 for the current time window 1432. The first discretized covariance function 1438 can be a function that represents a relationship between each current time window value within the current time window 1432. The current time window values can be values that were measured within the current time window 1432. To follow the illustrated example, the current time window values can be values measured at timepoints 1414-1, 1414-2, and 1414-3, such as value 1412-1-1 of the value sequence 1412-1 (e.g., illustrated as a temperature reading of 90° from device 27519_01 located within the current time window 1432).

In some implementations, the first discretized covariance function 1438 can be computed by the discretized covariance function computer 1436 based on the centered functions 1426. To do so, the function centering module 1420 can first compute the centered functions 1426 by subtracting a segment of the estimated mean function 1422 from a corresponding segment of each of the value sequences 1412 to obtain the centered value sequences 1425. These "segments" can refer to values measured within the current time window. For example, the segment of the estimated mean function 1422 can refer to the estimated mean function calculated for the timepoints 1414-1, 1414-2, and 1414-3 that are located within the current time window 1432. Similarly, the segments of each of the value sequences 1412 can refer to the segments of the value sequences 1412 measured at the timepoints 1414-1, 1414-2, and 1414-3. The discretized covariance function computer 1436 can compute the first discretized covariance function 1438 based on the centered value sequences 1425 of the centered functions 1426 (or the segments of the centered value sequences 1425 corresponding to the timepoints 1414 included in the current time window 1432).

The anomaly detection module can include an eigenanalysis (i.e., eigendecomposition) module 1440. The eigenanalysis module 1440 can perform eigenanalysis of the first discretized covariance function 1438 to estimate one or more first normalized eigenfunctions 1442 and one or more corresponding first eigenvalues 1444. The first normalized eigenfunction(s) 1442 can represent a "direction" of data along which a transformation occurs, while the eigenvalue corresponding to the eigenfunction can represent a degree of transformation.

For example, if the current time window 1432 is represented as window $(0, t_0)$, the functions 1416 are represented as $X_i$, the estimated mean function is represented as $\hat{\mu}_i$, and the timepoints 1414 are represented as a grid of timepoints p, the eigenanalysis module 1440 can perform eigenanalysis of the discretized covariance function 1438 of $X_i\text{-}\hat{\mu}_i$ to estimate the first normalized eigenfunction(s) 1442 as:

$$\hat{G}_0(s, t) = \sum_{k=1}^{p} \hat{\lambda}_{k,0}\hat{\phi}_{k,0}(s)\hat{\phi}_{k,0}(t),$$

Where $\hat{\phi}_{k,0}$ represents the first normalized eigenfunctions, $\hat{\lambda}_{k,0}$ represents the first normalized eigenvalues, and where $\hat{\lambda}_{1,0} \geq \hat{\lambda}_{2,0} \ldots \geq 0$. As such, by computing the above equation, the eigenanalysis module 1440 can perform eigendecomposition of the discretized covariance function $\hat{G}_0(s, t)$ to determine the first normalized eigenfunctions $\hat{\phi}_{k,0}$ and eigenvalues $\hat{\lambda}_{k,0}$. Similarly, once the time window is incremented from $(0, t_0)$ to $(t_1, t_0+t_1)$, the eigenanalysis module 1440 can again perform eigendecomposition of the discretized covariance function to determine the second normalized eigenfunctions $\hat{\phi}_{k,1}$ and eigenvalues $\hat{\lambda}_{k,1}$.

In some implementations, if the first normalized eigenfunction(s) 1442 include a plurality of eigenfunctions, the eigenanalysis module 1440 can select a "primary" or representative first normalized eigenfunction by identifying the first eigenfunction with the highest corresponding eigenvalue of the eigenvalues 1444. Selection of eigenfunction(s) will be discussed further with regards to FIG. 17.

Once the first normalized eigenfunction(s) 1442 are computed, the MWFPCA anomaly detection module 1408 can instruct the time window handler 1428 to increment the current time window 1432 to obtain a subsequent time window 1446. The current time window 1432 can be incremented such that a majority of the resulting subsequent time window 1446 overlaps a majority of the current time window 1432. The region of overlap between the current time window 1432 and the subsequent time window 1446 is referred to as shared window region 1448, which is illustrated as a dashed box in FIG. 14. To follow the illustrated example, the current time window 1432 can include values measured between timepoints 1414-1-1414-3. The current time window 1432 can then be incremented by one timepoint to obtain the subsequent time window 1446 which includes values measured at timepoints 1414-2-1414-4. As such, the shared window region can include values measured at timepoints 1414-2-1414-3.

Given the subsequent time window 1446, the discretized covariance function computer 1436 can compute a second discretized covariance function 1450 as described with regards to the first discretized covariance function 1438. For example, as described previously, the first discretized covariance function 1438 can be derived from the segment of the centered functions 1426 corresponding to the current time window 1432. As such, the second discretized covariance function 1450 can be derived from the segment of the centered functions 1426 corresponding to the subsequent time window 1446 (e.g., values from the centered value sequences 1425 corresponding to values measured at times within the subsequent time window 1446).

The eigenanalysis module 1440 can then perform eigenanalysis on the second discretized covariance function 1450 to obtain one or more second normalized eigenfunction(s) 1452 and one or more corresponding second eigenvalue(s) 1454. The second normalized eigenfunction(s) 1452 and second eigenvalue(s) 1454 can be computed by the eigenanalysis module 1440 as described with regards to the first normalized eigenfunction(s) 1442 and first eigenvalue(s) 1444.

The MWFPCA anomaly detection module 1408 can include an angle change computer 1456 (i.e., an angle change computation module). The angle change computer 1456 can compute angle change information 1458. The angle change information 1458 can describe an angle change between a first eigenfunction portion 1460 of the first normalized eigenfunction(s) 1442 and a second eigenfunction portion 1462 of the second normalized eigenfunction(s) 1452. The first eigenfunction portion 1460 can refer to a portion (i.e., a sub-eigenfunction) of one of the first normalized eigenfunction(s) 1442 that is located within the shared window region 1448 Similarly, the second eigenfunction portion 1462 can refer to a portion of one of the second normalized eigenfunction(s) 1452 that is located within the shared window region 1448.

For example, if the first eigenfunction portion 1460 is represented as a sub-eigenvector $\hat{\phi}_{k,0}$ and the second eigenfunction portion 1462 is represented as a sub-eigenvector $\hat{\phi}_{k,1}$, the angle change $\theta_{k,1}$ can be computed on the shared window region 1448 $(t_1, t_0)$ as $\hat{\phi}_{k,0}^*$ and $\hat{\phi}_{k,1}^*$, $$\theta_{k,1} = \arccos\left(\frac{\langle \hat{\phi}_{k,0}^*, \hat{\phi}_{k,1}^* \rangle}{\|\hat{\phi}_{k,0}^*\| \|\hat{\phi}_{k,1}^*\|}\right) = \arccos\left(\frac{\int_{t_1}^{t_0} \hat{\phi}_{k,0}(t)\hat{\phi}_{k,1}(t)dt}{\sqrt{\int_{t_1}^{t_0} \hat{\phi}_{k,0}^2(t)dt} \sqrt{\int_{t_1}^{t_0} \hat{\phi}_{k,1}^2(t)dt}}\right)$$

The MWFPCA anomaly detection module 1408 can include an angle change analyzer 1464. The angle change analyzer 1464 can analyze the angle change information 1458 to identify whether the angle change described in the angle change information 1458 is indicative of an anomalous window. As described herein, an "anomalous window" refers to a time window that is predicted to include anomalous values. The angle change analyzer 1464 can analyze the angle change information in relation to angle change calculated for preceding time windows. For example, assume that a relatively low angle change has been calculated for a multitude of preceding time windows. If the angle change information 1458 describes an angle change that is substantially greater than the angle changes calculated for preceding time windows, the angle change analyzer 1464 can generate an anomaly detection output 1466 indicating that either the current time window 1432 or the subsequent time window 1446 is an anomalous window. Alternatively, if angle change information 1458 describes an angle change that is slightly less than the angle changes calculated for preceding time windows, the angle change analyzer 1464 can generate an anomaly detection output 1466 indicating that neither the current time window 1432 nor the subsequent time window 1446 is an anomalous window. In some implementations, if the anomaly detection output 1466 is a positive anomaly detection output, the anomaly detection output 1466 can be a real-time anomaly detection alert indicating positive detection of an anomaly.

In some implementations, the angle change analyzer 1464 can evaluate the angle change information 1458 based on threshold information 1468. The threshold information 1468 can indicate a threshold angle change value. If the angle change described by the angle change information 1458 is greater than or equal to the threshold angle change, the angle change analyzer 1464 can generate a positive anomaly detection output 1466 indicating that the current time window 1432 and/or the subsequent time window 1446 is anomalous. Conversely, if the angle change described by the angle change information 1458 is less than the threshold angle change, the angle change analyzer 1464 can generate a negative anomaly detection output 1466 indicating that neither the current time window 1432 nor the subsequent time window 1446 is anomalous.

In some implementations, the angle change analyzer 1464 can track the angle change information 1458 over time as the time window handler 1428 increments the time window to identify whether the current time window or the subsequent time window is anomalous if an anomalous window is detected. For example, assume that the current time window 1432 is preceded by multiple preceding time windows. Further assume that the angle change between each of the preceding time windows was low. If the angle change described by the angle change information 1458 is much higher than the preceding angle changes, the angle change analyzer 1464 can infer that the subsequent time window 1446 is "responsible" for the high angle change because the values within the subsequent time window 1446 were most recently introduced. The angle change analyzer 1464 can then generate the anomaly detection output 1466 to identify the subsequent time window 1446 as an anomalous window.

In some implementations, the angle change analyzer 1464 can identify a particular function of the functions 1416 as an anomalous function. To do so, the angle change analyzer 1464 can "score" each of the functions by projecting each function onto a principal component, such as the eigenfunction of the second normalized eigenfunction(s) 1452 associated with the highest eigenvalue of the second eigenvalue(s) 1454. Scoring and identification of anomalous functions will be discussed subsequently in FIG. 18.

In some implementations, the angle change analyzer can generate a control output 1470 based on the anomaly detection output 1466. In some implementations, the control output 1470 can include instructions to store information indicating whether the current time window and/or the subsequent time window are anomalous. For example, the control output 1470 can cause the anomaly detection output 1466 to be stored in a repository, data structure, reporting log, etc.

In some implementations, the control output 1470 can be transmitted to device(s), such as reporting devices 1472, that regularly provide measured values for inclusion in the value sequences 1412. The reporting devices 1472 can be any type or manner of device that can regularly report measurement values, thereby forming the value sequences 1412 (e.g., Internet of Things (IoT) devices, etc.). In such instances, the MWFPCA anomaly detection module 1408 can access the functions 1416 by receiving a first set of real-time reporting data (not illustrated) received from the reporting devices 1472 that includes the values within the current time window 1432. Subsequently, the MWFPCA anomaly detection module 1408 can receive a second set of real-time reporting data (not illustrated) from the reporting devices 1472 that includes the values within the subsequent time window 1446. The time window handler 1428 can increment the current time window 1432 in response to (or prior to) receiving the second set of real-time reporting data.

For example, reporting devices 1472 can include a plurality of sensor devices (e.g., temperature sensors, etc.) that regularly report temperatures from different geographic locations in real-time. If the anomaly detection output 1466 is a positive anomaly detection output, the control output 1470 can include instructions configured to cause some (or all) of the reporting devices 1472 to restart. Alternatively, the control output 1470 may include modifications to a configuration of some (or all) of the reporting devices 1472.

In some implementations, rather than receiving the value sequences 1412 from a set of reporting devices 1472 such as IoT devices, the value sequences 1412 can be received from a controllable system 1474. The controllable system 1474 can be any type or manner of system, such as an autonomous system (e.g., software-defined vehicle, robotics system, etc.), cloud-based system, industrial processes, manufacturing systems, etc. For example, assume that the controllable system 1474 is a temperature control system that autonomously measures and controls temperature within a factory. If the anomaly detection output 1466 is a positive anomaly detection output indicating an anomaly, the control output 1470 can autonomously control the autonomous temperature control system to perform a remedial action.

In some implementations, the controllable system 1474 can be a machine learned model training system that uses the value sequences 1412 to train machine learned models. If the anomaly detection output 1466 is a positive anomaly detection output, the control output 1470 can instruct the controllable system 1474 to remove one or more values of the value sequences 1412 of the time-series dataset 1410 to obtain an optimized time-series dataset (not illustrated). The machine-learned model training system can then process the optimized time-series dataset with a machine-learned model to obtain a training output, evaluate the training output with an optimization function, and adjust one or more parameters of the machine-learned model.

Figure 15:
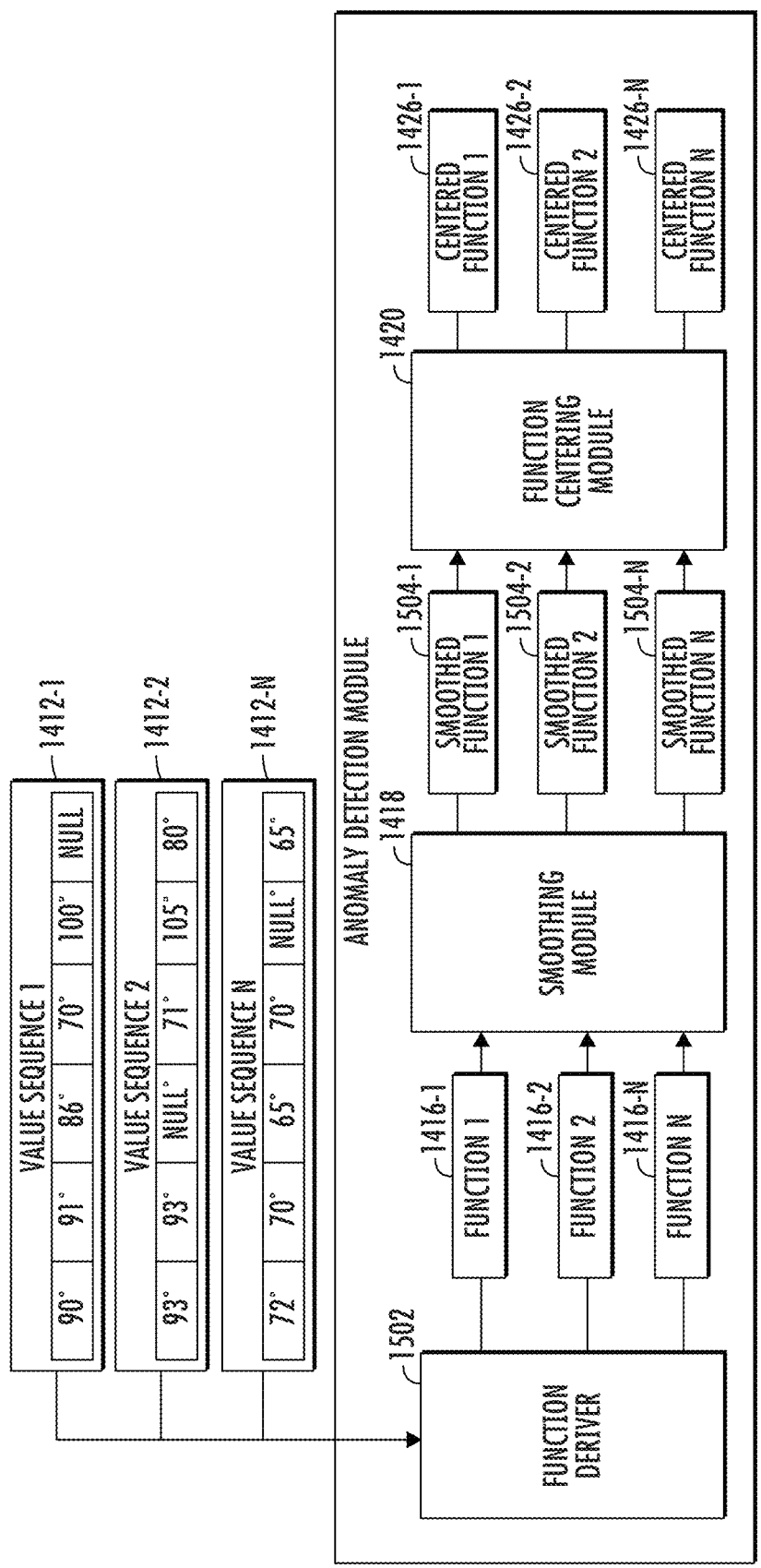
FIG. 15 is an example data flow diagram for functions processed within the anomaly detection module of FIG. 14, according to embodiments of the present technology.

FIG. 15 is an example data flow diagram for functions processed within the anomaly detection module of FIG. 14 according to some implementations of the present disclosure. FIG. 15 will be discussed in conjunction with FIG. 14. More specifically, the MWFPCA anomaly detection module 1408 can include a function deriver 1502. The function deriver 1502 can derive functions based on the value sequences 1412. For example, the function deriver 1502 can derive the function 1416-1 from the value sequence 1412-1, the function 1416-2 from the value sequence 1412-2, the function 1416-3 from the value sequence 1412-3, etc. The functions 1416 can be derived from the value sequences 1412 using any type of conventional derivation approach.

The smoothing module 1418 can apply a smoothing schema to the functions 1416-1 to obtain corresponding smoothed functions 1504-1-1504-N (generally, smoothed functions 1504). The function centering module 1420 can center the smoothed functions 1504 to obtain corresponding centered functions 1426. For example, the function centering module 1420 can center the smoothed function 1504-1 to obtain the centered function 1426-1, center the smoothed function 1504-2 to obtain the centered function 1426-2, etc.

Figure 16:
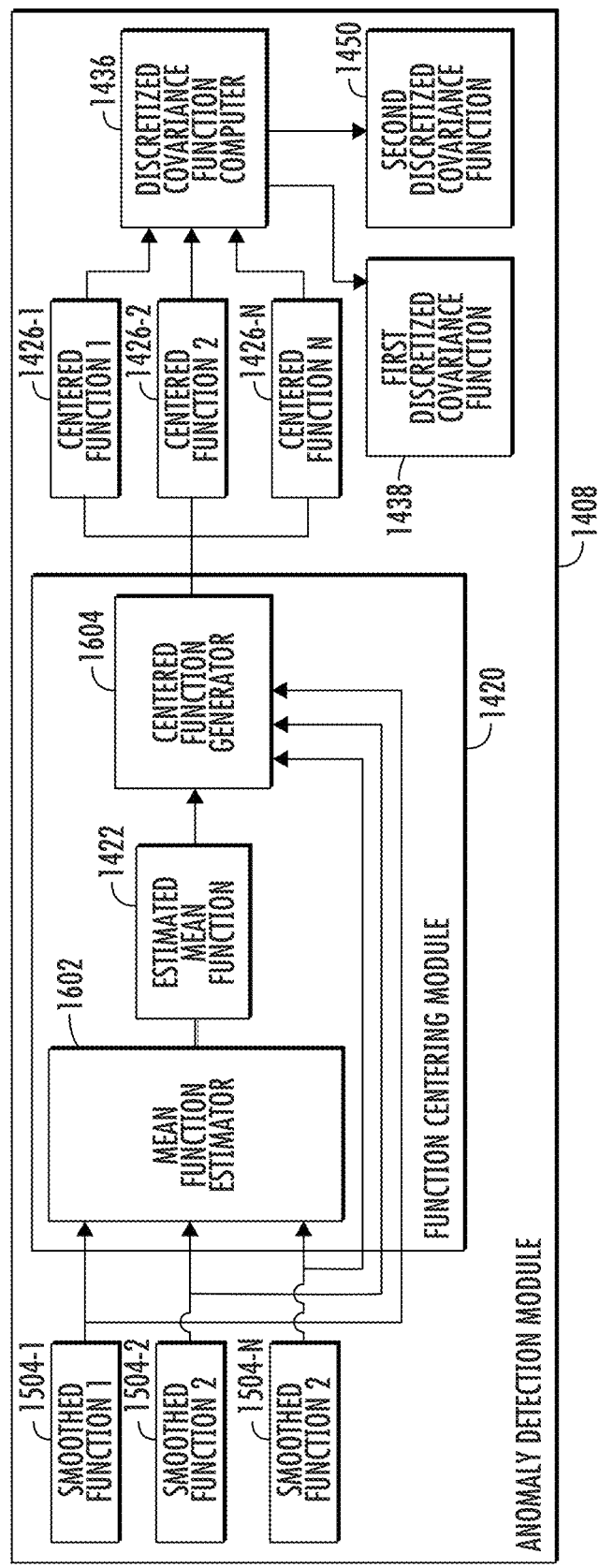
FIG. 16 is a block diagram of an example function centering module for centering smoothed functions, according to embodiments of the present technology.

FIG. 16 is a block diagram of an example function centering module for centering smoothed functions according to some implementations of the present disclosure. FIG. 16 will be discussed in conjunction with FIGS. 14 and 15. More specifically, the function centering module 1420 of the MWFPCA anomaly detection module 1408 can include a mean function estimator 1602. The mean function estimator 1602 an estimate the estimated mean function 1422 based on the smoothed functions 1504. More specifically, the mean function estimator 1602 can calculate the estimated mean values 1424 based on smoothed values of the smoothed functions 1504, and then derive the estimated mean function 1422 from the estimated mean values 1424.

The function centering module 1420 can include a centered function generator 1604. The centered function generator 1604 can generate the centered functions 1426 based on the estimated mean function 1422 and the smoothed functions 1504. For example, the centered function generator 1604 can generate the centered function 1426-1 by subtracting the mean values 1424 from the corresponding smoothed values of the smoothed function 1504-1 to generate the centered function 1426-1.

The discretized covariance function computer 1436 can compute the first discretized covariance function 1438 based on the centered functions 1426. More specifically, in some implementations, the first discretized covariance function 1438 can be computed based on a particular segment of the corresponding centered functions 1426 located within the current time window 1432.

For example, assume that the centered function 1426-1 includes centered values 1-5 that represent corresponding smoothed values 1-5 (not illustrated) of smoothed function 1504-1. Further assume that a segment of the smoothed values 1-3 were measured during the current time window 1432. A corresponding segment of the centered values 1-3 (not illustrated) can be used by the discretized covariance function computer 1436 to generate the first discretized covariance function 1438 for the current time window 1432. More specifically, the segment of the centered function 1426-1 and equivalent segments of the other centered functions 1426 that correspond to values measured within the current time window 1432 can be used to compute the first discretized covariance function 1438.

Similarly, once the current time window 1432 is incremented, the discretized covariance function computer 1436 can utilize subsequent segments of the centered functions 1426 to compute the second discretized covariance function 1450 for the subsequent time window 1446. The subsequent segments of the centered functions 1426 can be the values immediately succeeding the segments of the centered functions 1426 used to compute the first discretized covariance function 1438. For example, if the first discretized covariance function 1438 is computed based partially on centered values 1-3 of centered function 1426-1 which correspond to values measured at times within the current time window 1432, the second discretized covariance function 1450 can be computed based partially on centered values 4-5 of centered function 1426-1 which correspond to values measured at times within the subsequent time window 1446.

Figure 17:
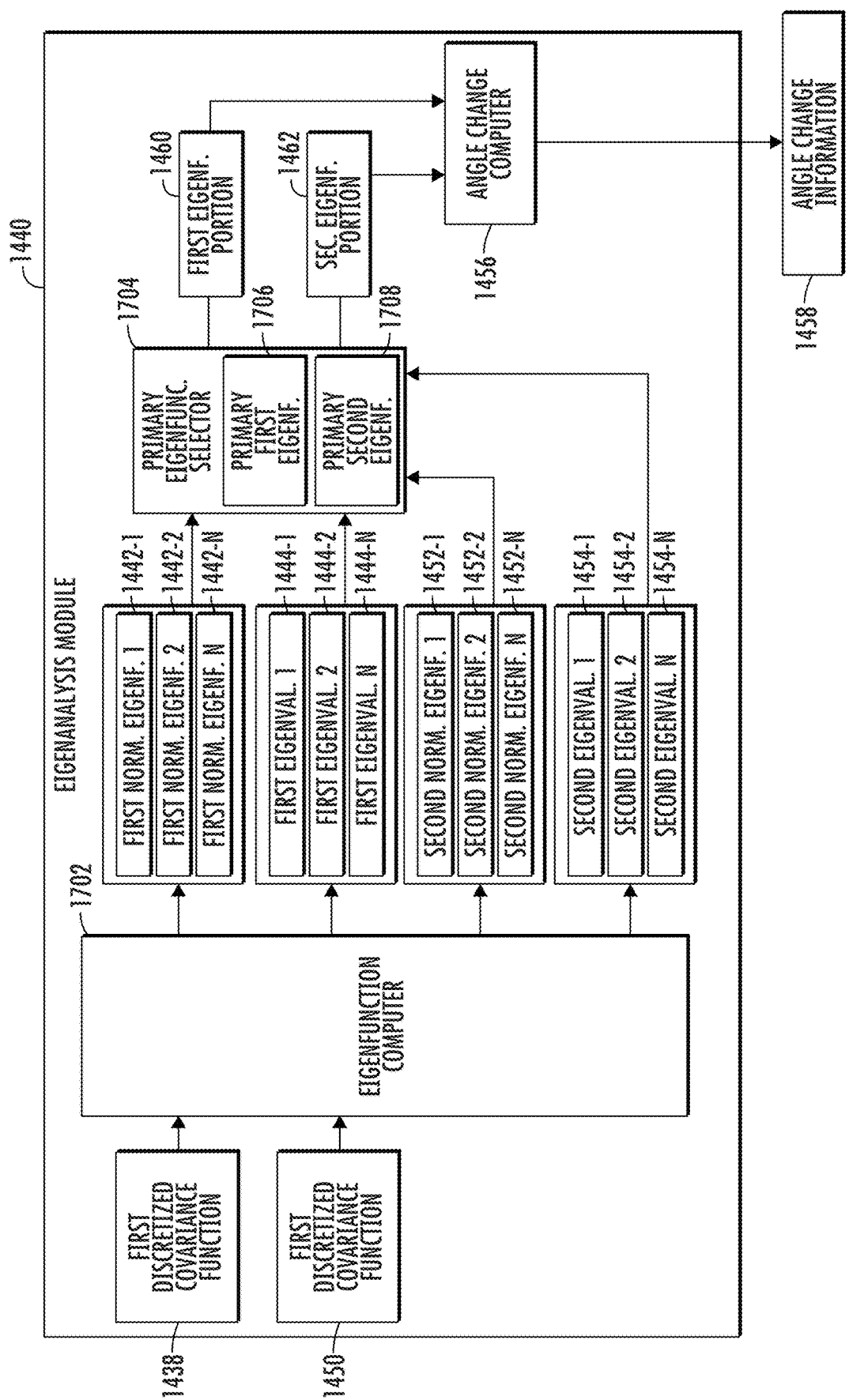
FIG. 17 is a block diagram of an example eigenanalysis module for performing eigenanalysis of discretized covariance functions, according to embodiments of the present technology.

FIG. 17 is a block diagram of an example eigenanalysis module for performing eigenanalysis of discretized covariance functions according to some implementations of the present disclosure. FIG. 17 will be discussed in conjunction with FIGS. 14-16. The eigenanalysis module 1440 can include an eigenfunction computer 1702. The eigenfunction computer 1702 can compute a plurality of first normalized eigenfunctions 1442 and a corresponding plurality of first eigenvalues 1444 based on the first discretized covariance function 1438. The eigenfunction computer 1702 can further compute a plurality of second normalized eigenfunctions 1452 and a corresponding plurality of second eigenvalues 1454 based on the second discretized covariance function 1450.

The eigenanalysis module 1440 can include a primary eigenfunction selector 1704. The primary eigenfunction selector 1704 can select "primary" eigenfunctions from which to compute the angle change information 1458. Specifically, the primary eigenfunction selector 1704 can select one of the first normalized eigenfunctions 1442 as a primary first eigenfunction 1706 based on the first normalized eigenfunction having a highest associated eigenvalue of the eigenvalues 1444. For example, if the first normalized eigenfunction 1442-1 is associated with the first eigenvalue 1444-1, and the first eigenvalue 1444-1 is greater than any other eigenvalue of the first eigenvalues 1444, the first normalized eigenfunction 1442-1 can be selected as the primary first eigenfunction 1706. The primary eigenfunction selector 1704 can similarly select an eigenfunction of the second normalized eigenfunctions 1452 as a primary second eigenfunction 1708.

The eigenanalysis module 1440 can include the angel change computer 1456. The angle change computer 1456 can generate the angle change information 1458 based on the first eigenfunction portion 1460 of the primary first eigenfunction 1706 and the second eigenfunction portion 1462 of the primary second eigenfunction 1708. The first eigenfunction portion 1460 of the primary first eigenfunction 1706 can be the portion of the primary first eigenfunction 1706 that is located within the shared window region 1448. Similarly, the second eigenfunction portion 1462 of the primary second eigenfunction 1708 can be the portion of the primary second eigenfunction 1708 that is located within the shared window region 1448.

Figure 18:
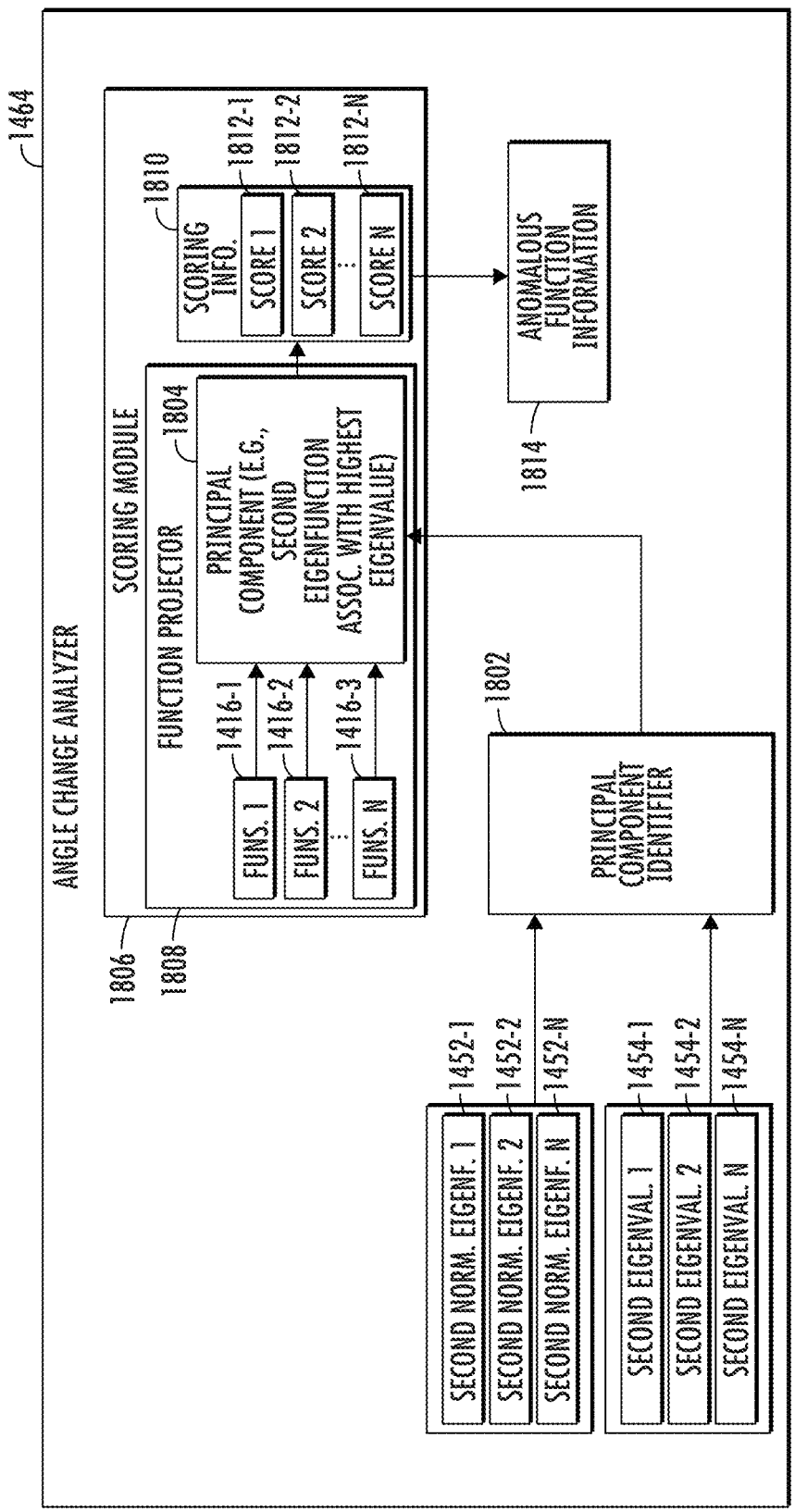
FIG. 18 is a block diagram of an example angle change analyzer for analyzing angle change between time windows of a time-series dataset, according to embodiments of the present technology.

FIG. 18 is a block diagram of an example angle change analyzer for analyzing angle change between time windows of a time-series dataset according to some implementations of the present disclosure. FIG. 18 will be discussed in conjunction with FIGS. 14-17. More specifically, the angle change analyzer 1464 can include a principal component identifier 1802. The principal component identifier 1802 can identify one of the second normalized eigenfunctions 1452 as being a principal component based on the second eigenvalues 1454. More specifically, in some implementations, the principal component identifier 1802 can identify one of the second normalized eigenfunctions 1452 as being a principal component 1804 based on the second eigenvalue associated with the second normalized eigenfunction being higher than any other eigenvalue of the second eigenvalues 1454, as described with regards to the primary eigenfunction selector 1704. As such, in some implementations, the principal component identifier 1802 can be or include the primary eigenfunction selector 1704. Alternatively, in some implementations, the principal component identifier 1802 can simply utilize the primary second eigenfunction 1708 identified by the primary eigenfunction selector 1704 as the principal component 1804 to reduce computing resource utilization.

The angle change analyzer 1464 can include a scoring module 1806. The scoring module 1806 can include a function projector 1808. The scoring module 1806 can utilize the function projector 1808 to score the functions 1416 to generate scoring information 1810. More specifically, the function projector can project each of the functions 1416 onto the principal component 1804 to obtain the scoring information 1810, which can include a respective plurality of scores 1812-1-1812-N (generally, scores 1812). For example, the function projector 1808 can project each function in accordance with:

$$\text{score}_i = \int X_i(t)\phi(t)dt$$

The scoring information 1810 can identify a particular function of the functions 1416 as being the "source" of an anomaly associated with an anomalous window. For example, the function projector 1808 can project each of the functions 1416 onto the principal component 1804 to obtain the scoring information 1810. Each of the scores included 1812 included in the scoring information 1810 can represent a degree of likelihood that a function is the source of an anomalous window. The scoring module 1806 can identify a function with a greatest variation in score (e.g., highest or lowest corresponding score) as being an anomalous function. The scoring module 1806 can then generate anomalous function information 1814 that identifies the particular function of the functions 1416 as being the source of the anomalous window.

Figure 19:
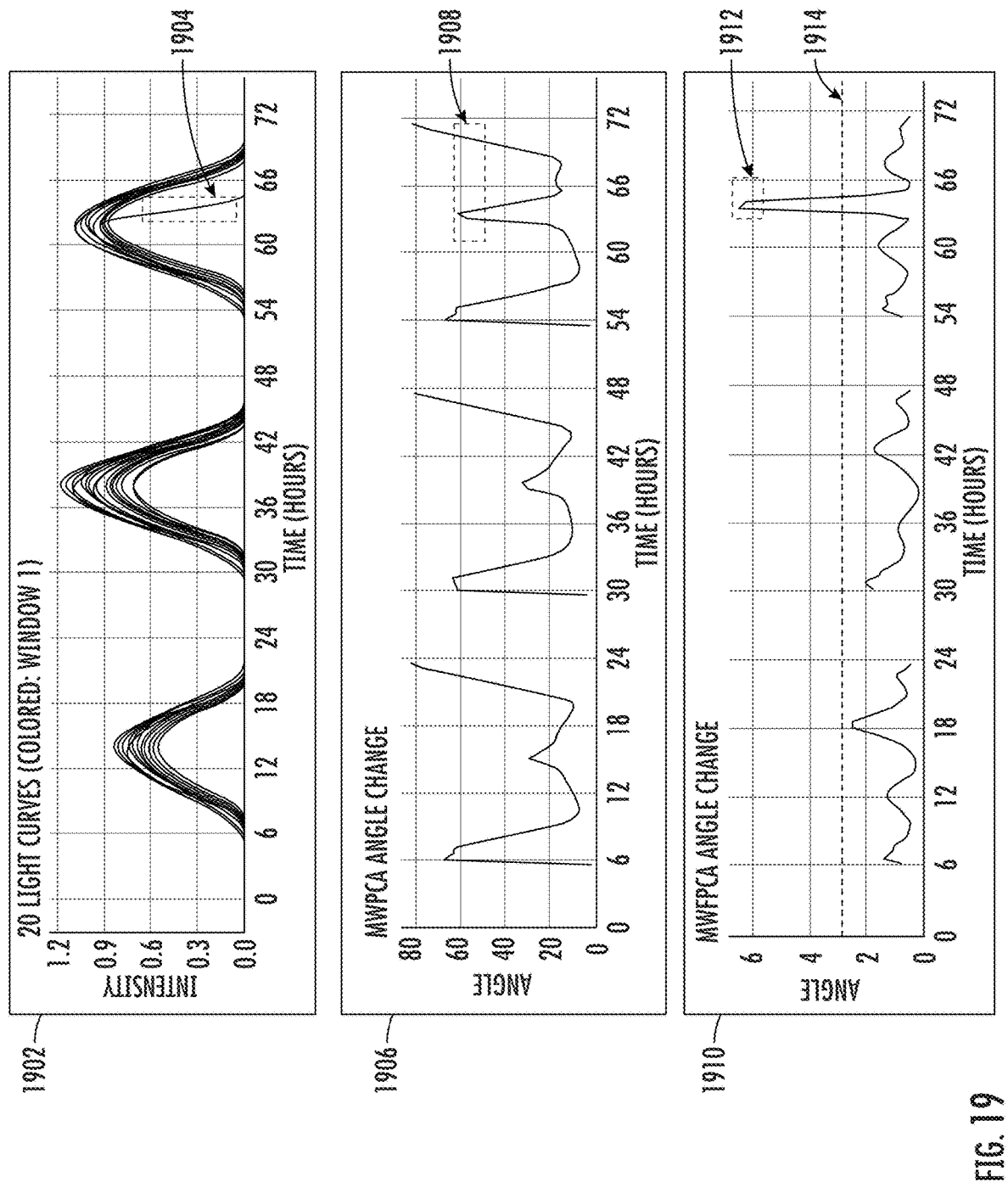
FIG. 19 illustrates example graph representations of angle changes for a light curve time-series data computed using MWPCA and example MWFPCA implementations, according to embodiments of the present technology.

FIG. 19 illustrates example graph representations of angle changes for a light curve time-series data computed using MWPCA and example MWFPCA implementations according to some implementations of the present disclosure. FIG. 19 will be discussed in conjunction with FIGS. 14-18. More specifically, light curve graph 1902 illustrates 20 light curve functions (e.g., functions 1416) representing value sequences (e.g., value sequences 1412) of a time-series dataset (e.g., time-series dataset 1410). At location 1904 of the light curve graph 1902, an anomalous sensor reading is received that reports a decrease in light intensity that varies substantially from other light curves within the same time window (e.g., hours 60-66).

MWPCA angle change graph 1906 illustrates an angle change calculated between moving windows for anomaly detection using a conventional MWPCA approach that analyzes the light curve functions in discrete space. Because conventional MWPCA approaches operate in discrete space, anomaly detection performance for MWPCA can be relatively poor when an anomaly is "masked" or occluded by temporally driven variations in data, such as the temporally driven variations for light curve graphs caused by the sun rising and setting. To follow the depicted example, although one light curve deviates from the other light curves at location 1904 of the light curve graph 1902, from a discrete space perspective, this deviation may not "register" because other curves are also decreasing substantially at the same time due to the sun setting between hours 60 and 66. This results in the anomaly being masked, as demonstrated at location 1908 of the MWPCA angle change graph 1906. At location 1908, the difference in angle change in the MWPCA angle change graph 1906 is insufficient to identify an anomaly in the data.

Conversely, MWFPCA angle change graph 1910 illustrates an angle change calculated between moving windows for anomaly detection using MWFPCA implementations of the present disclosure. Unlike conventional MWPCA approaches which operate in discrete space, the MWFPCA implementations described herein can operate in functional space and can therefore more effectively account for temporally driven variations in data. To follow the depicted example, the light curve that deviates from the other light curves at location 1904 of the light curve graph 1902 can be identified as anomalous at location 1912 of the MWFPCA angle change graph 1910. Location 1912 depicts an angle change higher than a threshold angle change 1914 that corresponds to the anomaly identified at location 1904 of the light curve graph 1902. This is because MWFPCA can operate on functional space, and in turn, can account for temporally driven variations in data such as the sun setting. In such fashion, MWFPCA implementations described herein can be leveraged to identify anomalous data in functional datasets that cannot be identified using conventional MWPCA approaches that operate on discrete space.

Figure 20:
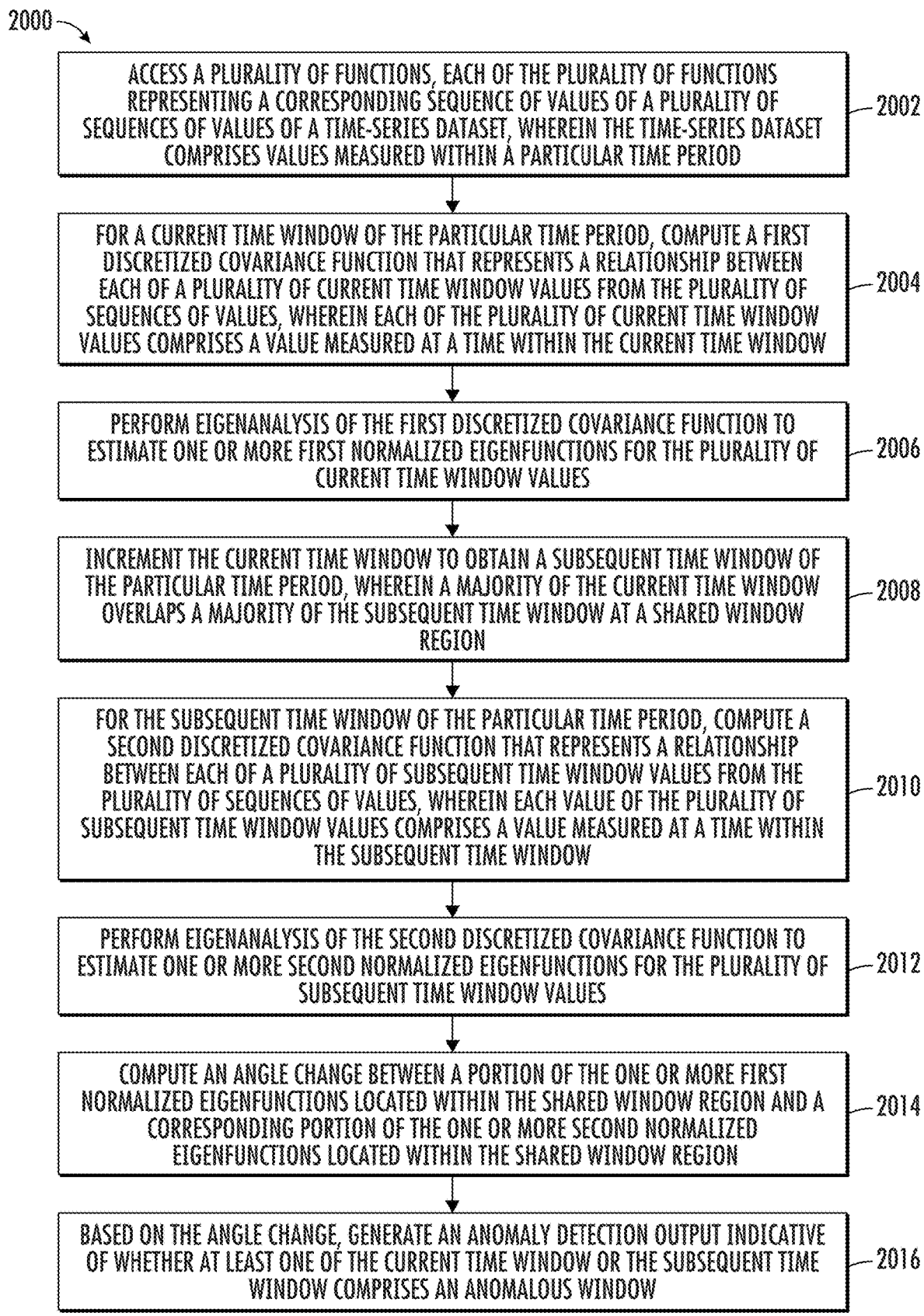
FIG. 20 is a flowchart diagram for a method for MWFPCA for anomaly detection, according to embodiments of the present technology.

FIG. 20 is a flowchart diagram for a method 2000 for MWFPCA for anomaly detection according to some implementations of the present disclosure. Although FIG. 20 depicts steps performed in a particular order for purposes of illustration and discussion, the methods of the present disclosure are not limited to the particularly illustrated order or arrangement. The various operations of the method 2000 can be omitted, rearranged, combined, and/or adapted in various ways without deviating from the scope of the present disclosure.

At 2002, a computing system can access a plurality of functions. Each of the plurality of functions can represent a corresponding sequence of values of a plurality of sequences of values of a time-series dataset. The time-series dataset can include values measured within a particular time period. In some implementations, each of the plurality of sequences of values of a time-series dataset is measured by a corresponding device of a plurality of devices. In some implementations, the plurality of devices includes a plurality of IoT devices. In some implementations, the computing system can apply a function smoothing process to the plurality of functions.

In some implementations, to access the plurality of functions, the computing system can compute a first estimated mean function for the plurality of functions. The first estimated mean function can represent a sequence of mean values. The computing system can compute, for each function of the plurality of functions, a corresponding centered function of a plurality of centered functions by subtracting each value of a segment of the sequence of mean values from a corresponding value of a segment of the sequence of values represented by the function. The plurality of centered functions can respectively represent a plurality of centered value sequences. The segment of the sequence of mean values and the segment of the sequence of values represented by the function can include values measured within the current time window.

At 2004, the computing system can, for a current time window of the particular time period, compute a first discretized covariance function that represents a relationship between each of a plurality of current time window values from the plurality of sequences of values. Each of the plurality of current time window values can include a value measured at a time within the current time window.

In some implementations, to compute the first discretized covariance function that represents the relationship between each of the plurality of current time window values from the plurality of sequences of values, the computing system can compute the first discretized covariance function based on a first subset of centered values of the plurality of centered value sequences. Each value of the first subset of centered values can include a value measured at a time within the current time window.

At 2006, the computing system can perform eigenanalysis of the first discretized covariance function to estimate one or more first normalized eigenfunctions for the plurality of current time window values. In some implementations, the computing system can perform eigenanalysis of the first discretized covariance function to estimate a plurality of first normalized eigenfunctions and a plurality of first eigenvalues respectively associated with the plurality of first normalized eigenfunctions. The computing system can further identify a primary first eigenfunction from the plurality of first normalized eigenfunctions based on a particular first eigenvalue associated with the primary first eigenfunction being greater than any other first eigenvalue of the plurality of first eigenvalues.

At 2008, the computing system can increment the current time window to obtain a subsequent time window of the particular time period. A majority of the current time window can overlap a majority of the subsequent time window at a shared window region.

At 2010, the computing system can, for the subsequent time window of the particular time period, compute a second discretized covariance function that represents a relationship between each of a plurality of subsequent time window values from the plurality of sequences of values. Each value of the plurality of subsequent time window values can include a value measured at a time within the subsequent time window. In some implementations, the computing system can compute the second discretized covariance function based on a second subset of centered values of the plurality of centered value sequences. Each value of the second subset of centered values can include a value measured at a time within the subsequent time window.

At 2012, the computing system can perform eigenanalysis of the second discretized covariance function to estimate one or more second normalized eigenfunctions for the plurality of subsequent time window values. In some implementations, the computing system can perform eigenanalysis of the second discretized covariance function to estimate a plurality of second normalized eigenfunctions and a plurality of second eigenvalues respectively associated with the plurality of second normalized eigenfunctions. The computing system can further identify a primary second eigenfunction from the plurality of second normalized eigenfunctions based on a particular second eigenvalue associated with the primary second eigenfunction being greater than any other second eigenvalue of the plurality of second eigenvalues.

At 2014, the computing system can compute an angle change between a portion of the one or more first normalized eigenfunctions located within the shared window region and a corresponding portion of the one or more second normalized eigenfunctions located within the shared window region. In some implementations, the computing system can compute the angle change between a portion of the primary first normalized eigenfunction located within the shared window region and a corresponding portion of the primary second normalized eigenfunction located within the shared window region.

At 2016, the computing system can, based on the angle change, generate an anomaly detection output indicative of whether at least one of the current time window or the subsequent time window comprises an anomalous window. In some implementations, the anomaly detection output indicates that the subsequent time window comprises an anomalous window. In some implementations, the anomaly detection output can further identify an anomalous IoT device of the plurality of IoT devices. In some implementations, the computing system can transmit instructions to the anomalous IoT device, wherein the instructions are configured to cause the anomalous IoT device to restart. In some implementations, the computing system can modify a configuration of the anomalous IoT device based on the anomaly detection output.

In some implementations, the computing system can generate a negative anomaly detection output indicating that neither the current time window nor the subsequent time window includes an anomalous window. The computing system can store information indicating that values obtained within the current time window and the subsequent time window are non-anomalous.

In some implementations, the computing system can continue to increment the time window until the end of the time period is reached so that the entirety of the time-series dataset can be analyzed. For example, for each of a plurality of remaining time windows of the particular time period, the computing system can:

Increment a preceding time window to obtain a new time window of the particular time period. For a first "loop" following computation of the angle change for the subsequent time window, the "preceding" time window can refer to fdxcszthe "subsequent" time window and the "new" time window can refer to the time window that results from incrementing the "subsequent" time window. A majority of the preceding time window can overlap a majority of the new time window at a new shared window region.

For the new time window of the particular time period, compute a new discretized covariance function that represents a relationship between each of a plurality of new time window values from the plurality of sequences of values. Each value of the plurality of new time window values can include a value measured at a time within the new time window.

Perform eigenanalysis of the new discretized covariance function to estimate one or more new normalized eigenfunctions for the plurality of new time window values.

Compute a new angle change between a portion of one or more preceding normalized eigenfunctions located within the new shared window region and a corresponding portion of the one or more new normalized eigenfunctions located within the new shared window region.

Based on the new angle change, generate a new anomaly detection output indicative of whether at least one of the new time window or the preceding time window comprises an anomalous window.

In some implementations, the positive anomaly detection output identifies a first function of the plurality of functions as an anomalous function. To generate the anomaly detection output, the computing system can project each of the plurality of functions onto the primary second normalized eigenfunction to generate a respective plurality of scores. The primary second normalized eigenfunction can be (or include) a principal component. Each of the plurality of scores can represent a degree of variance between a corresponding function and each other function of the plurality of functions. The computing system can identify the first function of the plurality of functions as the anomalous function based on the first function corresponding to a highest score of the plurality of scores.

In some implementations, to generate the positive anomaly detection output, the computing system can make a determination that the angle change is less than one or more preceding angle changes computed prior to computing the angle change. Responsive to the determination, the computing system can generate the positive anomaly detection output. The positive anomaly detection output identifies a subset of candidate anomalous values from the plurality of sequence of values. Each of the subset of candidate anomalous values can be values that exited the shared window region when the current time window was incremented to obtain the subsequent time window.

In some implementations, the computing system can autonomously control a controllable system based at least in part on the positive anomaly detection output. In some implementations, the computing system can, responsive to the anomaly detection output, remove one or more current time window values of the plurality of current time window values from the time-series dataset to obtain an optimized time-series dataset. The computing system can process the optimized time-series dataset with a machine-learned model to obtain a training output. The computing system can evaluate the training output with an optimization function, and, based on evaluating the training output with an optimization function, adjust one or more parameters of the machine-learned model.

In some implementations, the computing system can, responsive to the anomaly detection output, receive a first set of real-time reporting data comprising the plurality of current time window values and a second set of real-time reporting data comprising the plurality of subsequent time window values. In some implementations, the computing system can, responsive to the positive anomaly detection output indicating that the at least one of the current time window or the subsequent time window is an anomalous window, transmit a real-time anomaly detection alert indicative of the positive anomaly detection output.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-program product tangibly embodied in a non-transitory machine-readable storage medium, the computer-program product including instructions operable to cause one or more processor devices to:
    access a plurality of functions, each of the plurality of functions representing a corresponding sequence of values of a plurality of sequences of values of a time-series dataset, wherein the time-series dataset comprises values measured within a particular time period;
    for a current time window of the particular time period, compute a first discretized covariance function that represents a relationship between each of a plurality of current time window values from the plurality of sequences of values, wherein each of the plurality of current time window values comprises a value measured at a time within the current time window;
    perform eigenanalysis of the first discretized covariance function to estimate one or more first normalized eigenfunctions for the plurality of current time window values;
    increment the current time window to obtain a subsequent time window of the particular time period, wherein a majority of the current time window overlaps a majority of the subsequent time window at a shared window region;
    for the subsequent time window of the particular time period, compute a second discretized covariance function that represents a relationship between each of a plurality of subsequent time window values from the plurality of sequences of values, wherein each value of the plurality of subsequent time window values comprises a value measured at a time within the subsequent time window;
    perform eigenanalysis of the second discretized covariance function to estimate one or more second normalized eigenfunctions for the plurality of subsequent time window values;
    compute an angle change between a portion of the one or more first normalized eigenfunctions located within the shared window region and a corresponding portion of the one or more second normalized eigenfunctions located within the shared window region;
    based on the angle change, generate an anomaly detection output indicative of whether at least one of the current time window or the subsequent time window comprises an anomalous window; and
    present the generated anomaly detection output for subsequent removal of one or more current time window values of the plurality of current time window values from the time-series dataset to obtain an optimized time-series dataset.

2. The computer-program product of claim 1, wherein the one or more processor devices are further to:
    for each of a plurality of remaining time windows of the particular time period:
        increment a preceding time window to obtain a new time window of the particular time period, wherein a majority of the preceding time window overlaps a majority of the new time window at a new shared window region; and
        for the new time window of the particular time period, compute a new discretized covariance function that represents a relationship between each of a plurality of new time window values from the plurality of sequences of values, wherein each value of the plurality of new time window values comprises a value measured at a time within the new time window;
        perform eigenanalysis of the new discretized covariance function to estimate one or more new normalized eigenfunctions for the plurality of new time window values;
        compute a new angle change between a portion of one or more preceding normalized eigenfunctions located within the new shared window region and a corresponding portion of the one or more new normalized eigenfunctions located within the new shared window region; and
        based on the new angle change, generate a new anomaly detection output indicative of whether at least one of the new time window or the preceding time window comprises an anomalous window.

3. The computer-program product of claim 1, wherein, to access the plurality of functions, the one or more processor devices are further to:
    compute a first estimated mean function for the plurality of functions, the first estimated mean function representing a sequence of mean values; and
    compute, for each function of the plurality of functions, a corresponding centered function of a plurality of centered functions by subtracting each value of a segment of the sequence of mean values from a corresponding value of a segment of the sequence of values represented by the function, wherein the plurality of centered functions respectively represent a plurality of centered value sequences, wherein the segment of the sequence of mean values and the segment of the sequence of values represented by the function comprise values measured within the current time window.

4. The computer-program product of claim 3, wherein, to compute the first discretized covariance function that represents the relationship between each of the plurality of current time window values from the plurality of sequences of values, the one or more processor devices are to:

compute the first discretized covariance function based on a first subset of centered values of the plurality of centered value sequences, wherein each of the first subset of centered values comprises a value measured at a time within the current time window.

5. The computer-program product of claim 4, wherein, compute the second discretized covariance function that represents the relationship between each of the plurality of subsequent time window values from the plurality of sequences of values, the one or more processor devices are to:

compute the second discretized covariance function based on a second subset of centered values of the plurality of centered value sequences, wherein each of the second subset of centered values comprises a value measured at a time within the subsequent time window.

6. The computer-program product of claim 1, wherein each of the plurality of sequences of values of a time-series dataset is measured by a corresponding device of a plurality of devices.

7. The computer-program product of claim 6, wherein the plurality of devices comprises a plurality of Internet-of-Things (IoT) devices.

8. The computer-program product of claim 7, wherein the anomaly detection output indicates that the subsequent time window comprises an anomalous window, wherein the anomaly detection output further identifies an anomalous IoT device of the plurality of IoT devices, and wherein the one or more processor devices are further to:

transmit instructions to the anomalous IoT device, wherein the instructions are configured to cause the anomalous IoT device to restart.

9. The computer-program product of claim 7, wherein the anomaly detection output indicates that the subsequent time window comprises an anomalous window, wherein the anomaly detection output further identifies an anomalous IoT device of the plurality of IoT devices, and wherein the one or more processor devices are further to:

modify a configuration of the anomalous IoT device based on the anomaly detection output.

10. The computer-program product of claim 1, wherein, to generate the anomaly detection output, the one or more processor devices are further to:

generate a negative anomaly detection output indicating that either the current time window or the subsequent time window comprises a non-anomalous window.

11. The computer-program product of claim 10, wherein, responsive to the negative anomaly detection output, the one or more processor devices are further to:

store information indicating that values obtained within either the current time window or the subsequent time window are non-anomalous.

12. The computer-program product of claim 1, wherein, to perform the eigenanalysis of the first discretized covariance function to estimate the one or more first normalized eigenfunctions, the one or more processor devices are to:

perform eigenanalysis of the first discretized covariance function to estimate a plurality of first normalized eigenfunctions and a plurality of first eigenvalues respectively associated with the plurality of first normalized eigenfunctions; and identify a primary first eigenfunction from the plurality of first normalized eigenfunctions based on a particular first eigenvalue associated with the primary first eigenfunction being greater than any other first eigenvalue of the plurality of first eigenvalues.

13. The computer-program product of claim 12, wherein, to perform the eigenanalysis of the second discretized covariance function to estimate the one or more second normalized eigenfunctions, the one or more processor devices are to:

perform eigenanalysis of the second discretized covariance function to estimate a plurality of second normalized eigenfunctions and a plurality of second eigenvalues respectively associated with the plurality of second normalized eigenfunctions; and identify a primary second eigenfunction from the plurality of second normalized eigenfunctions based on a particular second eigenvalue associated with the primary second eigenfunction being greater than any other second eigenvalue of the plurality of second eigenvalues.

14. The computer-program product of claim 13, wherein, to compute the angle change, the one or more processor devices are to:

compute the angle change between a portion of the primary first eigenfunction located within the shared window region and a corresponding portion of the primary second eigenfunction located within the shared window region.

15. The computer-program product of claim 14, wherein, to generate the anomaly detection output, the one or more processor devices are to:

generate a positive anomaly detection output indicating that the at least one of the current time window or the subsequent time window comprises an anomalous window.

16. The computer-program product of claim 15, wherein the positive anomaly detection output identifies a first function of the plurality of functions as an anomalous function, and wherein, to generate the anomaly detection output, the one or more processor devices are to:

project each of the plurality of functions onto the primary second eigenfunction to generate a respective plurality of scores, wherein the primary second eigenfunction comprises a principal component, wherein each of the plurality of scores represents a degree of variance between a corresponding function and each other function of the plurality of functions; and identify the first function of the plurality of functions as the anomalous function based on the first function corresponding to a highest score of the plurality of scores.

17. The computer-program product of claim 15, wherein, to generate the positive anomaly detection output, the one or more processor devices are to:

make a determination that the angle change is less than one or more preceding angle changes computed prior to computing the angle change; and responsive to the determination, generate the positive anomaly detection output, wherein the positive anomaly detection output identifies a subset of candidate anomalous values comprising the one or more current time window values from the plurality of sequences of values, and wherein each of the subset of candidate anomalous values exited the shared window region when the current time window was incremented to obtain the subsequent time window.

18. The computer-program product of claim 15, wherein the one or more processor devices are further to:
autonomously control a controllable system based at least in part on the positive anomaly detection output.

19. The computer-program product of claim 1, wherein the one or more processor devices are further to:
process the optimized time-series dataset with a machine-learned model to obtain a training output;
evaluate the training output with an optimization function; and
based on evaluating the training output with an optimization function, adjust one or more parameters of the machine-learned model.

20. The computer-program product of claim 1, wherein, to access the plurality of functions, the one or more processor devices are to:
receive a first set of real-time reporting data comprising the plurality of current time window values.

21. The computer-program product of claim 20, wherein, to increment the current time window to obtain the subsequent time window of the particular time period, the one or more processor devices are to:
receive a second set of real-time reporting data comprising the plurality of subsequent time window values.

22. The computer-program product of claim 21, wherein the anomaly detection output comprises a positive anomaly detection output indicating that the at least one of the current time window or the subsequent time window comprises an anomalous window, and wherein the one or more processor devices are further to:
transmit a real-time anomaly detection alert indicative of the positive anomaly detection output.

23. The computer-program product of claim 1, wherein, to access the plurality of functions, the one or more processor devices are further to:
apply a function smoothing process to the plurality of functions.

24. A system, comprising:
one or more data processors; and
a non-transitory computer-readable storage medium containing instructions which, when executed on the one or more data processors, cause the one or more data processors to:
access a plurality of functions, each of the plurality of functions representing a corresponding sequence of values of a plurality of sequences of values of a time-series dataset, wherein the time-series dataset comprises values measured within a particular time period;
for a current time window of the particular time period, compute a first discretized covariance function that represents a relationship between each of a plurality of current time window values from the plurality of sequences of values, wherein each of the plurality of current time window values comprises a value measured at a time within the current time window;
perform eigenanalysis of the first discretized covariance function to estimate one or more first normalized eigenfunctions for the plurality of current time window values;
increment the current time window to obtain a subsequent time window of the particular time period, wherein a majority of the current time window overlaps a majority of the subsequent time window at a shared window region;
for the subsequent time window of the particular time period, compute a second discretized covariance function that represents a relationship between each of a plurality of subsequent time window values from the plurality of sequences of values, wherein each value of the plurality of subsequent time window values comprises a value measured at a time within the subsequent time window;
perform eigenanalysis of the second discretized covariance function to estimate one or more second normalized eigenfunctions for the plurality of subsequent time window values;
compute an angle change between a portion of the one or more first normalized eigenfunctions located within the shared window region and a corresponding portion of the one or more second normalized eigenfunctions located within the shared window region;
based on the angle change, generate an anomaly detection output indicative of whether at least one of the current time window or the subsequent time window comprises an anomalous window; and
present the generated anomaly detection output for subsequent removal of one or more current time window values of the plurality of current time window values from the time-series dataset to obtain an optimized time-series dataset.

25. The system of claim 24, wherein the one or more data processors are further to:
for each of a plurality of remaining time windows of the particular time period:
increment a preceding time window to obtain a new time window of the particular time period, wherein a majority of the preceding time window overlaps a majority of the new time window at a new shared window region; and
for the new time window of the particular time period, compute a new discretized covariance function that represents a relationship between each of a plurality of new time window values from the plurality of sequences of values, wherein each value of the plurality of new time window values comprises a value measured at a time within the new time window;
perform eigenanalysis of the new discretized covariance function to estimate one or more new normalized eigenfunctions for the plurality of new time window values;
compute a new angle change between a portion of one or more preceding normalized eigenfunctions located within the new shared window region and a corresponding portion of the one or more new normalized eigenfunctions located within the new shared window region; and
based on the new angle change, generate a new anomaly detection output indicative of whether at least one of the new time window or the preceding time window comprises an anomalous window.

26. The system of claim 25, wherein, to access the plurality of functions, the one or more data processors are further to:
compute a first estimated mean function for the plurality of functions, the first estimated mean function representing a sequence of mean values; and
compute, for each function of the plurality of functions, a corresponding centered function of a plurality of centered functions by subtracting each value of a segment of the sequence of mean values from a corresponding value of a segment of the sequence of values represented by the function, wherein the plurality of centered functions respectively represent a plurality of centered value sequences, wherein the segment of the sequence of mean values and the segment of the sequence of values represented by the function comprise values measured within the current time window.

27. The system of claim 26, wherein, to compute the first discretized covariance function that represents the relationship between each of the plurality of current time window values from the plurality of sequences of values, the one or more data processors are to:
compute the first discretized covariance function based on a first subset of centered values of the plurality of centered value sequences, wherein each of the first subset of centered values comprises a value measured at a time within the current time window.

28. A computer-implemented method, comprising:
accessing, by a computing system comprising one or more processor devices, a plurality of functions, each of the plurality of functions representing a corresponding sequence of values of a plurality of sequences of values of a time-series dataset, wherein the time-series dataset comprises values measured within a particular time period;
for a current time window of the particular time period, computing a first discretized covariance function that represents a relationship between each of a plurality of current time window values from the plurality of sequences of values, wherein each of the plurality of current time window values comprises a value measured at a time within the current time window;
performing eigenanalysis of the first discretized covariance function to estimate one or more first normalized eigenfunctions for the plurality of current time window values;
incrementing the current time window to obtain a subsequent time window of the particular time period, wherein a majority of the current time window overlaps a majority of the subsequent time window at a shared window region;
for the subsequent time window of the particular time period, computing a second discretized covariance function that represents a relationship between each of a plurality of subsequent time window values from the plurality of sequences of values, wherein each value of the plurality of subsequent time window values comprises a value measured at a time within the subsequent time window;
performing eigenanalysis of the second discretized covariance function to estimate one or more second normalized eigenfunctions for the plurality of subsequent time window values;
computing an angle change between a portion of the one or more first normalized eigenfunctions located within the shared window region and a corresponding portion of the one or more second normalized eigenfunctions located within the shared window region;
based on the angle change, generating an anomaly detection output indicative of whether at least one of the current time window or the subsequent time window comprises an anomalous window; and
presenting the generated anomaly detection output for subsequent removal of the one or more current time window values of the plurality of current time window values from the time-series dataset to obtain an optimized time-series dataset.

29. An apparatus, comprising:
one or more processors;
a plurality of modules; and
a memory communicatively coupled to the one or more processors and storing instructions that, when executed by the one or more processors, cause the one or more processors to:
access a plurality of functions, each of the plurality of functions representing a corresponding sequence of values of a plurality of sequences of values of a time-series dataset, wherein the time-series dataset comprises values measured within a particular time period;
for a current time window of the particular time period, compute, using a discretized covariance function computation module of the plurality of modules, a first discretized covariance function that represents a relationship between each of a plurality of current time window values from the plurality of sequences of values, wherein each of the plurality of current time window values comprises a value measured at a time within the current time window;
perform, using an eigenanalysis module of the plurality of modules, eigenanalysis of the first discretized covariance function to estimate one or more first normalized eigenfunctions for the plurality of current time window values;
increment the current time window to obtain a subsequent time window of the particular time period, wherein a majority of the current time window overlaps a majority of the subsequent time window at a shared window region;
for the subsequent time window of the particular time period, compute, using the discretized covariance function computation module of the plurality of modules, a second discretized covariance function that represents a relationship between each of a plurality of subsequent time window values from the plurality of sequences of values, wherein each value of the plurality of subsequent time window values comprises a value measured at a time within the subsequent time window;
perform, using the eigenanalysis module of the plurality of modules, eigenanalysis of the second discretized covariance function to estimate one or more second normalized eigenfunctions for the plurality of subsequent time window values;
compute, using an angle change computation module of the plurality of modules, an angle change between a portion of the one or more first normalized eigenfunctions located within the shared window region and a corresponding portion of the one or more second normalized eigenfunctions located within the shared window region;
based on the angle change, generate, using an anomaly detection module of the plurality of modules, an anomaly detection output indicative of whether at least one of the current time window or the subsequent time window comprises an anomalous window; and
present the generated anomaly detection output for subsequent removal of the one or more current time window values of the plurality of current time window values from the time-series dataset to obtain an optimized time-series dataset.

* * * * *